(12) United States Patent
Prabhakar et al.

(10) Patent No.: US 11,928,512 B2
(45) Date of Patent: Mar. 12, 2024

(54) QUIESCE RECONFIGURABLE DATA PROCESSOR

(71) Applicant: SambaNova Systems, Inc., Palo Alto, CA (US)

(72) Inventors: Raghu Prabhakar, San Jose, CA (US); Manish K. Shah, Austin, TX (US); Pramod Nataraja, San Jose, CA (US); David Brian Jackson, Dana Point, CA (US); Kin Hing Leung, Cupertino, CA (US); Ram Sivaramakrishnan, San Jose, CA (US); Sumti Jairath, Santa Clara, CA (US); Gregory Frederick Grohoski, Bee Cave, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 264 days.

(21) Appl. No.: 17/322,697

(22) Filed: May 17, 2021

(65) Prior Publication Data

US 2021/0271519 A1    Sep. 2, 2021

Related U.S. Application Data

(63) Continuation of application No. 16/504,627, filed on Jul. 8, 2019, now Pat. No. 11,055,141.

(51) Int. Cl.
*G06F 9/50* (2006.01)
*G06F 15/80* (2006.01)

(52) U.S. Cl.
CPC ............ *G06F 9/5027* (2013.01); *G06F 15/80* (2013.01); *G06F 2209/506* (2013.01)

(58) Field of Classification Search
CPC .................................................... G06F 9/5027
See application file for complete search history.

(56) References Cited

U.S. PATENT DOCUMENTS

| 4,769,790 A | 9/1988 | Yamashita |
| 5,560,029 A | 9/1996 | Papadopoulos et al. |

(Continued)

FOREIGN PATENT DOCUMENTS

| CN | 1122026 A | 5/1996 |
| EP | 0733234 A1 | 9/1996 |

(Continued)

OTHER PUBLICATIONS

AMBA AXI and ACE Protocol Specification, ARM, as early as Jan. 2003, 440 pages.

(Continued)

*Primary Examiner* — Charlie Sun
(74) *Attorney, Agent, or Firm* — Flagship Patents; Bruce A. Young; Sikander M. Khan

(57) ABSTRACT

A reconfigurable data processor comprises an array of configurable units configurable to allocate a plurality of sets of configurable units in the array to implement respective execution fragments of the data processing operation. Quiesce logic is coupled to configurable units in the array, configurable to respond to a quiesce control signal to quiesce the sets of configurable units in the array on quiesce boundaries of the respective execution fragments, and to forward quiesce ready signals for the respective execution fragments when the corresponding sets of processing units are ready. An array quiesce controller distributes the quiesce control signal to configurable units in the array, and receives quiesce ready signals for the respective execution fragments from the quiesce logic.

10 Claims, 16 Drawing Sheets

(56) References Cited

U.S. PATENT DOCUMENTS

| | | | |
|---|---|---|---|
| 5,794,033 | A | 8/1998 | Aldebert et al. |
| 5,963,746 | A | 10/1999 | Barker et al. |
| 6,105,119 | A | 8/2000 | Kerr et al. |
| 6,119,181 | A | 9/2000 | Vorbach et al. |
| 6,728,871 | B1 | 4/2004 | Vorbach et al. |
| 7,797,258 | B1 | 9/2010 | Bowman et al. |
| 7,952,387 | B1 | 5/2011 | Frazer |
| 7,996,684 | B2 | 8/2011 | Wasson et al. |
| 8,006,021 | B1 | 8/2011 | Li et al. |
| 8,045,546 | B1 | 10/2011 | Bao et al. |
| 8,261,042 | B2 | 9/2012 | Kanstein et al. |
| 8,656,141 | B1 | 2/2014 | Agarwal |
| 9,158,575 | B2 | 10/2015 | Smith |
| 9,201,899 | B2 | 12/2015 | Nishimura et al. |
| 9,411,532 | B2 | 8/2016 | Vorbach et al. |
| 9,569,214 | B2 | 2/2017 | Govindu et al. |
| 9,690,747 | B2 | 6/2017 | Vorbach et al. |
| 9,697,318 | B2 | 7/2017 | Hutton et al. |
| 9,875,105 | B2 | 1/2018 | Rozas et al. |
| 9,952,831 | B1 | 4/2018 | Ross et al. |
| 10,037,227 | B2 | 7/2018 | Therien et al. |
| 10,067,911 | B2 | 9/2018 | Gholaminejad et al. |
| 10,698,853 | B1 | 6/2020 | Grohoski et al. |
| 10,831,507 | B2 | 11/2020 | Shah et al. |
| 2001/0047509 | A1 | 11/2001 | Mason et al. |
| 2004/0049672 | A1 | 3/2004 | Nollet et al. |
| 2004/0153608 | A1 | 8/2004 | Vorbach et al. |
| 2005/0091468 | A1 | 4/2005 | Morita et al. |
| 2005/0108503 | A1 | 5/2005 | Sandon et al. |
| 2006/0010306 | A1 | 1/2006 | Saito et al. |
| 2006/0190517 | A1 | 8/2006 | Guerrero |
| 2007/0046326 | A1 | 3/2007 | Fujisawa et al. |
| 2007/0180172 | A1 | 8/2007 | Schmidt et al. |
| 2009/0031089 | A1 | 1/2009 | Tuominen |
| 2009/0113169 | A1 | 4/2009 | Yang et al. |
| 2009/0135739 | A1 | 5/2009 | Hoover et al. |
| 2010/0161309 | A1 | 6/2010 | Chartraire et al. |
| 2010/0268862 | A1 | 10/2010 | Park et al. |
| 2011/0264723 | A1 | 10/2011 | Yagain |
| 2012/0126851 | A1 | 5/2012 | Kelem et al. |
| 2012/0131257 | A1 | 5/2012 | Rudosky et al. |
| 2013/0024621 | A1 | 1/2013 | Choi et al. |
| 2013/0227255 | A1 | 8/2013 | Kim |
| 2013/0326190 | A1 | 12/2013 | Chung et al. |
| 2014/0149480 | A1 | 5/2014 | Catanzaro et al. |
| 2014/0237227 | A1 | 8/2014 | Aizawa |
| 2014/0317628 | A1 | 10/2014 | Kim |
| 2014/0331031 | A1 | 11/2014 | Suh et al. |
| 2015/0347192 | A1 | 12/2015 | Blaine et al. |
| 2016/0012012 | A1 | 1/2016 | Yen et al. |
| 2016/0139955 | A1* | 5/2016 | Fee ................ G06F 9/4812 718/103 |
| 2017/0083313 | A1 | 3/2017 | Sankaralingam et al. |
| 2017/0105130 | A1 | 4/2017 | Chen et al. |
| 2017/0123794 | A1 | 5/2017 | Chen et al. |
| 2017/0161204 | A1 | 6/2017 | Roberts et al. |
| 2017/0185564 | A1 | 6/2017 | Toichi |
| 2017/0317678 | A1 | 11/2017 | Coole et al. |
| 2018/0089117 | A1 | 3/2018 | Nicol |
| 2018/0121121 | A1 | 5/2018 | Mehra et al. |
| 2018/0157825 | A1 | 6/2018 | Eksten et al. |
| 2018/0189231 | A1 | 7/2018 | Fleming, Jr. et al. |
| 2018/0275193 | A1 | 9/2018 | Rouge et al. |
| 2018/0349098 | A1 | 12/2018 | Manohararajah |
| 2019/0042513 | A1 | 2/2019 | Fleming, Jr. et al. |
| 2019/0042924 | A1 | 2/2019 | Pasca et al. |
| 2019/0056969 | A1 | 2/2019 | Khandros et al. |
| 2019/0084296 | A1 | 3/2019 | Shaul et al. |
| 2019/0147323 | A1 | 5/2019 | Li et al. |
| 2019/0171604 | A1 | 6/2019 | Brewer |
| 2019/0205734 | A1 | 7/2019 | Guntoro |
| 2019/0213153 | A1 | 7/2019 | Pan et al. |
| 2019/0303297 | A1 | 10/2019 | Fleming, Jr. et al. |
| 2019/0317770 | A1 | 10/2019 | Sankaralingam et al. |
| 2020/0125396 | A1 | 4/2020 | Chynoweth et al. |
| 2020/0159544 | A1 | 5/2020 | Shah et al. |
| 2021/0055940 | A1 | 2/2021 | Shah et al. |

FOREIGN PATENT DOCUMENTS

| | | |
|---|---|---|
| EP | 1372084 A2 | 12/2003 |
| EP | 2441013 B1 | 8/2014 |
| TW | 200801964 A | 1/2008 |
| TW | 200928736 A | 7/2009 |
| TW | 201346758 A | 11/2013 |
| TW | 201610708 A | 3/2016 |
| TW | 201730761 A | 9/2017 |
| TW | 201833767 A | 9/2018 |
| WO | 2010142987 A1 | 12/2010 |

OTHER PUBLICATIONS 80.192.25.230: "Producer-consumer problem", Feb. 7, 2013 (Feb. 7, 2013), XP055530821, Retrieved from the Internet: URL:https://en.wikipedia.org/w/index.php?t>itle=Producer%E2%80%93consumer_problem&oldid=537111527[retrieved on Dec. 6, 2018], 4 pages.

Ando et al., "A Multithreaded CGRA for Convolutional Neural Network Processing," Scientific Research Publishing, Circuits and Systems, Jun. 2017, pp. 149-170.

Anonymous, Activation Function, Wikipedia, Retrieved on Aug. 16, 2019, 3 pages. Retrieved from [ URL: https://en.wikipedia.org/wiki/Activation_function ].

Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.

Benoit et al: "Automatic Task Scheduling/ Loop Unrolling using Dedicated RTR Controllers in Coarse Grain Reconfigurable Architectures", Parallel and Distributed Processing Symposium, 2005. Proceedings. 19th IEEE International Denver, CO, USA Apr. 4-8, 2005, Piscataway, NJ, USA,IEEE, Apr. 4, 2005 (Apr. 4, 2005), pp. 148a-148a, XP010785667, DOI: 10.1109/IPDPS.2005.119, ISBN: 978-0-7695-2312-5, 8 pages.

De Sutter et al., "Coarse-Grained Reconfigurable Array Architectures," 2010 Handbook of Signal Processing Systems, 37 pages.

Eppler et al. ,"High speed neural network chip for trigger purposes in high energy physics," IEEE, Proc. of the conference on design, automation and test in Europe, Feb. 1998, 8 pages.

Fiolhais et al., "Overlay Architectures for Space Applications," SpacE FPGA Users Workshop, Apr. 9-11, 2018, pp. 1-20.

Gomar et al. "Precise digital implementations of hyperbolic tanh and sigmoid function," 2016 50th Asilomar Conference on Signals, Systems and Computers, Nov. 6-9, 2016, 4 pages.

Harris et al., "Architectures and Algorithms for User Customization of CNNs," ASP-DAC 2018, 32 pages.

Hartenstein, "Coarse Grain Reconfigurable Architectures," IEEE, 2001, 6 pages.

Iannucci, "Toward a dataflow/von Neumann hybrid architecture," ISCA '88 Proc. of the 15th Annual ISCA, May 30-Jun. 2, 1988, 10 pages.

Jafri et al., "NeuroCGRA: A CGRAs with Support for Neural Networks," 2014 International Conference on High Performance Computing & Simulation (HPCS), 8 pages.

Koeplinger et al., "Spatial: A Language and Compiler for Application Accelerators," PLDI '18, Jun. 18-22, 2018, Association for Computng Machinery, 16 pages.

Li, et al., "CATERPILLAR: Coarse Grain Reconfigurable Architecture for Accelerating the Training of Deep Neural Networks," arXiv: 1706.00517v2 [cs.DC], Jun. 8, 2017, 10 pages.

Lin et al., "A Digital Circuit Design of Hyperbolic Tangent Sigmoid Function for Neural Networks," 2018 IEEE Int'l Symp. on Circuits and Systems, May 18-21, 2018, 4 pages.

Nicol, "A Course Grain Reconfigurable Array (CGRA) for Statically Scheduled Data Flow Computing," Wave Computing, May 3, 2017, 9 pages.

Nicol, "Wave Computing: A Dataflow Processing Chip for Training Deep Neural Networks," 2017, 25 pages.

(56) References Cited

OTHER PUBLICATIONS

Paek et al., "Binary Acceleration Using Coarse-Grained Reconfigurable Architecture," ACM SIGARCH Computer Architecture News, vol. 38, No. 4, Sep. 2010, 7 pages.
PCT/US2019/062287—International Search Report and Written Opinion dated Feb. 5, 2020, 18 pages.
PCT/US2019/062289—International Search Report and Written Opinion dated Feb. 28, 2020, 14 pages.
PCT/US2020/012079—International Search Report and Written Opinion dated Apr. 29, 2020, 18 pages.
PCT/US2020/014652—International Search Report and Written Opinion dated May 26, 2020, 9 pages.
PCT/US2020/040832—International Search Report and the Written Opinion dated Sep. 18, 2020, 18 pages.
PCT/US2020/32186—International Search Report and Written Opinion dated Aug. 14, 2020; 21 pages.
Prabhakar, et al., "Plasticine: A Reconfigurable Architecture For Parallel Patterns", pp. 389-402, IEEE, Jun. 24, 2017.
Tanomoto et al., "A CGRA-based Approach for Accelerating Convolutional Neural Networks," 2015 IEEE 9th International Symposium on Embedded Multicore/Many-core Systems-on-Chip, 2015, pp. 73-80.
Tobuschat, et al., "IDAMC: A NoC for mixed criticality systems," 2013 IEEE 19th International Conference on Embedded and Real-Time Computing Systems and Applications, Taipei, Aug. 19-21, 2013, pp. 149-156.
Turkson et al. "Artificial neural network applications in the calibration of spark-ignition engines: An overview," Engineering Science and Technology, an International Journal, vol. 19, Issue 3, Sep. 2016, 1346-1359.
TW 109102852—Office Action dated Jan. 30, 2020, 6 pages.
U.S. Appl. No. 16/239,252—Office Action dated Aug. 7, 2019, 8 pages.
U.S. Appl. No. 16/862,445—Office Action dated Mar. 18, 2021, 25 pages.
U.S. Office Action from U.S. Appl. No. 16/260,548 dated Dec. 26, 2019, 9 pages.
U.S. Office Action from U.S. Appl. No. 16/407,675 dated May 18, 2020, 9 pages.
U.S. Office Action from U.S. Appl. No. 16/407,675 dated Oct. 29, 2020, 7 pages.
Vadivel et al., "Loop Overhead Reduction Techniques for Coarse Grained Reconfigurable Architectures," ResearchGate, Conference Paper, Aug. 2017, https://www.researchgate.net/publication/319416458, 9 pages.
Vranjkovic et al., "Coarse-Grained Reconfigurable Hardware Accelerator of Machine Learning Classifiers," IWSSIP 2016, The 23rd International Conference on Systems, Signals and Image Processing, May 23-25, 2016, Bratislava, Slovakia, 5 pages.
Wang, et al., "Reconfigurable Hardware Accelerators: Opportunities, Trends and Challenges," Cornell University, Dec. 13, 2017, 25 pages.
Wentzlaff et al: "On-Chip Interconnection Architecture of the Tile Processor", IEEE Micro, IEEE Service Center, Los Alamitos, CA, US, vol. 27, No. 5, Sep. 1, 2007 (Sep. 1, 2007), pp. 15-31, XP011196754.
Wijtvliet et al., "Coarse Grained Reconfigurable Architectures in the Past 25 Years: Overview and Classification," IEEE 2016, pp. 235-244.
Wijtvliet, Course Syllabus for "Accelerators and Coarse Grained Reconfigurable Architectures," Advanced School for Computing and Imaging, 2017, 2 pages.
Zhang, "Design of Coarse-Grained Reconfigurable Architecture for Digital Signal Processing," Implementation Aspects, Master of Science Thesis, Feb. 2009, 110 pages.
CA-3120683 Office Action, dated Sep. 1, 2021, 3 pages.
U.S. Appl. No. 16/862,445 Notice of Allowance, dated Sep. 17, 2021, 15 pages.
U.S. Appl. No. 17/093,543 Office Action dated Oct. 12, 2021, 20 pages.
TW 108142191—First Office Action dated, Nov. 3, 2021, 17 pages.
EP 207029398 Rules 161(1) and 162 Communication, dated Aug. 18, 2021, 3 pages.
CA 3120683 Voluntary Amendments, dated Aug. 4, 2021, 9 pages.
EP 198213613 Rules 161(1) and 162 Communication, dated Jul. 1, 2021, 3 pages.
PCT/US2020/032186 International Preliminary Report on Patentability, dated Nov. 18, 2021, 15 pages.
TW 109114892—Response to First Office Action dated Jul. 22, 2021, filed Oct. 26, 2021, 16 pages.
U.S. Appl. No. 16/239,252 Final Office Action, dated Jan. 8, 2020, 13 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
PCT-US2020-012079 International Preliminary Report on Patentability, dated May 7, 2021, 14 pages.
PCT/US2019/062287 International Preliminary Report on Patentability, dated Feb. 19, 2021, 31 pages.
PCT/US2019/062289—International Preliminary Report on Patentability dated Feb. 19, 2021, 27 pages.
Intentionally Blank.
PCT/US2020/014652 International Preliminary Report on Patentability, dated Aug. 12, 2021, 7 pages.
Podobas et al, A Survey on Coarse-Grained Reconfigurable Architectures From a Performance Perspective, IEEEAccess, vol. 2020. 3012084, Jul. 27, 2020, 25 pages.

* cited by examiner

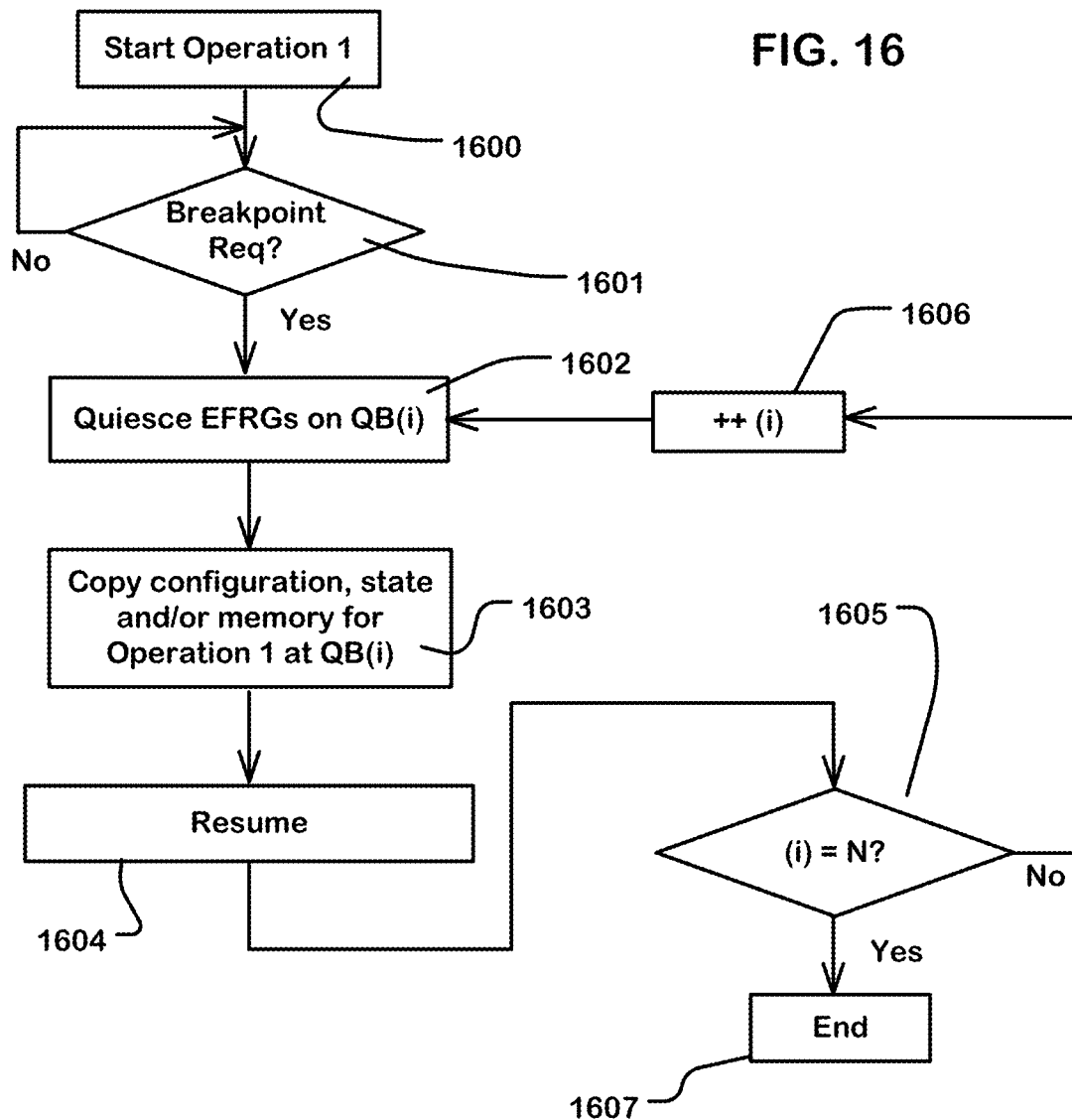

QUIESCE RECONFIGURABLE DATA PROCESSOR

PRIORITY APPLICATION

This application is a continuation of co-pending U.S. patent application Ser. No. 16/504,627 filed 8 Jul. 2019, which application is incorporated herein by reference.

BACKGROUND

Technological Field

The present technology relates to quiesce in reconfigurable architectures and other distributed processing architectures, and can be particularly applied to quiesce of operations executing on coarse-grain reconfigurable architectures.

Description of Related Art

Reconfigurable processors, including field programmable gate arrays (FPGAs), can be configured to implement a variety of functions more efficiently or faster than might be achieved using a general purpose processor executing a computer program. So-called coarse-grain reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA'17, Jun. 24-28, 2017, Toronto, ON, Canada.

Checkpointing, multitasking and multiprogramming in distributed processing systems, such as CGRAs, present complex issues. Typically, the runtime control program can only load a configuration file and execute the machine as configured to completion, and thereafter allow the hardware to quiesce. There may be no capability to interrupt the machine during execution, for system management functions like preemptive multitasking and debug. In order to maximize operating efficiency, and to be able to coordinate among processing units on a processing system such as the configurable processing elements of a reconfigurable processor, a means of efficiently managing quiesce of processing units is needed.

SUMMARY

A technology is described which enables efficient quiesce of processing units of a data processing system, including quiesce among configurable units of a Coarse-Grained Reconfigurable Array processor.

A processing system is described that comprises an array of processing units configurable and reconfigurable to allocate a set of processing units in the array to implement an execution fragment of a data processing operation. Quiesce logic, including logic circuits, is provided that is coupled to some or all of the processing units in the array. The quiesce logic circuits are configurable to respond to a control signal to quiesce the set of data processing units in the array on a quiesce boundary of the execution fragment. In embodiments described herein the processing units in the set can be distributed in the array and operate asynchronously. The quiesce logic is operable to synchronize the set of processing units operating asynchronously on quiesce boundaries. The quiesce boundaries can be defined by configuration data in an array of configurable processing units.

In some embodiments, the array of processing units is configurable to allocate a plurality of sets of processing units in the array, designated execution fragment resource groups EFRGs, to implement respective execution fragments of the data processing operation, where an execution fragment comprises for example in a CGRA, a subset of operations in the control and data flow graph of the data processing operation. The quiesce logic in this case can include a quiesce controller to distribute a quiesce control signal to quiesce logic associated with processing units in the array, and to receive quiesce ready signals from the respective sets of processing units.

A method for operating a processing system including an array of configurable processing units with quiesce is described. The method can comprise loading configuration data to the array for a data processing operation, which configures the array into a plurality of EFRGs for corresponding execution fragments having quiesce boundaries; and distributing a quiesce command to the plurality of EFRGs in the array. The quiesce command distributed to the array can be generated in response to an external quiesce event, such as runtime control program in a host processor that signals a quiesce controller for the array to support multitasking for example, or from an internal quiesce event (self-quiesce) generated by the data processing operation in the array that is provided by a control network to the quiesce controller for the array. In the execution fragment resource groups, the method includes responding to the quiesce command to detect quiesce boundaries following the quiesce command in the corresponding execution fragments, disabling execution of the corresponding execution fragments beyond the quiesce boundaries, and raising quiesce ready signals for the corresponding execution fragments. The quiesce boundaries can be defined in the configuration data by sets of configured states of execution in the processing units of each EFRG. The method can include detecting the quiesce boundary in an EFRG by detecting the set of configured states of the processing units in the group.

A technology is described by which the quiesce logic is configurable for a given EFRG to define a quiesce boundary, or a plurality of quiesce boundaries, in the execution fragment, and to quiesce the processing units in the EFRG on a quiesce boundary in response to the control signal. In examples described, counters can be included, such as loop counters, which count execution loops or other types of processing cycles in the processing units to detect the configured states in the processing units in the EFRG. The quiesce logic can be responsive to the counters to detect events, such as configured states, in the processing units corresponding to quiesce boundaries in the execution fragments, and otherwise track progress of the execution fragment in the EFRG. Thus, the quiesce logic is able to synchronize the quiesce operation on the quiesce boundary in the EFRG allocated to the execution fragment. In examples described, a skew counter is provided to track differences in progress of the execution fragment among the processing units in the EFRG. In some embodiments, the skew counter is non-zero when there is pending work remaining in the execution fragment before program execution can reach the next quiesce boundary; alternatively a non-zero value of the skew counter can also be thought of as reflecting that the program is not at a quiesce boundary. In other embodiments, different values of the skew counter or different tracking means may indicate these conditions.

Execution fragments in examples of systems described herein are allocated to sets of processing units, in which one or more processing unit in the set is configured as a producer of inputs, and one or more processing unit in the set is configured as a consumer of inputs. A quiesce technique is described in which the quiesce logic is configurable to stop the producer, or each producer, on the quiesce boundary, and to quiesce the EFRG after the consumer, or each consumer, finishes processing of the inputs produced prior to the quiesce boundary.

An architecture is described herein in which the processing system includes a control barrier network coupled to the processing units in the array. The control barrier network can comprise a control bus configurable to form signal routes in the control barrier network, and a plurality of barrier logic units having inputs and outputs connected to the control bus and to the array of processing units. In support of the quiesce logic, a first logic unit for the EFRG allocated for a particular execution fragment, is configurable to receive tokens (P_QB) from producers in the execution fragment, where the tokens signal events in the producer units corresponding to a quiesce boundary in the execution fragment and generate a producer barrier token on the output based on the tokens from the producers. The producer barrier token can be used to enable the producers in the set to proceed beyond the quiesce boundary of the execution fragment. Also, a second logic unit for the EFRG allocated for the particular execution fragment, is configurable to receive tokens (C_QB) from the consumer units in the set of processor units to generate a consumer barrier token on the output based on the tokens from the consumers. The consumer barrier tokens can be used in the quiesce logic with the producer barrier tokens to synchronize the set of units on a quiesce boundary. The quiesce logic can be configurable to connect to the control bus, and can include a skew counter configurable to receive the producer barrier tokens and the consumer barrier tokens to track differences in progress of the execution fragment among the producers and consumers including skew of quiesce boundary tokens (P_QB and C_QB) among the processing units in the set.

In addition, an enable circuit can be provided to produce an enable signal for an associated processor unit in the EFRG configured as a producer in response to the producer barrier token and other data and control dependencies. Also, an enable circuit can be provided which is configurable to produce an enable signal for an associated processor unit in the EFRG configured as a consumer in response to data and control dependencies. The producer barrier tokens and consumer barrier tokens can be used to track differences in progress of the execution fragment among the producers and consumers. Also, the quiesce logic can halt the producers by disabling the producer barrier tokens, and the EFRG will quiesce after consumers reach a configured status.

In a quiesce architecture described herein, an array quiesce controller can include logic to forward the control signal to the quiesce logic for the processing units in the array. The quiesce logic associated with the sets of processing units can include quiesce ready logic associated with corresponding processing units in the array to provide a quiesce ready signal to the array quiesce controller. In examples described herein, the quiesce ready logic for the processing units are connected in a daisy chain among processing units in the array. The quiesce ready logic can forward the quiesce ready signal to the array quiesce controller on the daisy chain when the quiesce ready signal from a previous member of the daisy chain is received, and quiesce of the corresponding EFRG is ready. Also, the architecture can provide a configurable quiesce participated flag, and logic to override the quiesce ready logic in response to the state of the quiesce participate flag. In this manner, the array can be configured to use the quiesce ready signals associated with producers in the quiesce ready logic.

In general, a method for operating a processing system, including an array of configurable processing units, is provided that comprises monitoring progress of an execution fragment of a data processing operation in an EFRG in the array; and responding to a control signal to quiesce the set of data processing units in the array on a quiesce boundary of the execution fragment.

The method can include monitoring progress in a plurality of sets of processing units in the array of respective execution fragments of the data processing operation, distributing a quiesce control signal to processing units in the array, and receiving quiesce ready signals from the respective sets of processing units.

Also, for a processing system including logic to define a plurality of quiesce boundaries in the execution fragment, the method can include quiescing the processing units in the EFRG on a common quiesce boundary after the control signal.

Techniques are provided as well for tracking differences in progress of the execution fragment across quiesce boundaries among the processing units in an EFRG.

A method for operating a data processing system is described, in which an array of configurable units is coupled to a host executing a control program that generates a quiesce control signal in support of checkpoint operations, breakpoint operations, suspend and resume operations, multiprogramming and multitasking on reconfigurable systems and other functions, such as those to aid in debugging a program running on the array of configurable units. In one operation, a control program can iteratively quiesce an operation on quiesce boundaries, unload a copy of checkpoint data like state data and memory contents at each quiesce boundary, resume the operation and repeat to gather information concerning performance of the operation over quiesce boundaries.

Also, method for operating a data processing system is described, in which an array of configurable units is coupled to a host executing a control program in a multiprogramming environment where data processing operations in the array of processing units may yield resources from time to time for use by other processes, and in a multitasking environment where data processing operations in the array of processing units can be forced to yield resources in response to a scheduler, an interrupt, or other external forces. The control program can manage multiple operations for execution using the array of configurable units, including assigning priority among the operations upon multiprogramming or multitasking events in which resources are being yielded. Utilizing technologies described herein, a host can schedule operations according to priority, including upon a triggering event for an operation having higher priority than an operation deployed in the array of configurable units, the control program can suspend the executing program on a quiesce boundary, unload all or parts of the configuration file, state and working memory for the executing program at the quiesce boundary, and then load the configuration file for a higher priority operation, and start execution of the higher priority file. Also, on completion of the higher priority operation, optionally the suspended operation can be resumed by loading its configuration file, state and memory, and resuming the operation at the quiesce boundary.

Other aspects and advantages of the technology described herein can be seen on review of the drawings, the detailed description and the claims, which follow.

BRIEF DESCRIPTION OF THE DRAWINGS

FIG. 2A illustrates an example switch unit connecting elements in an array level network.

FIG. 16 is a flow chart for a method to unload breakpoint files for data processing operations in a configurable array using quiesce.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
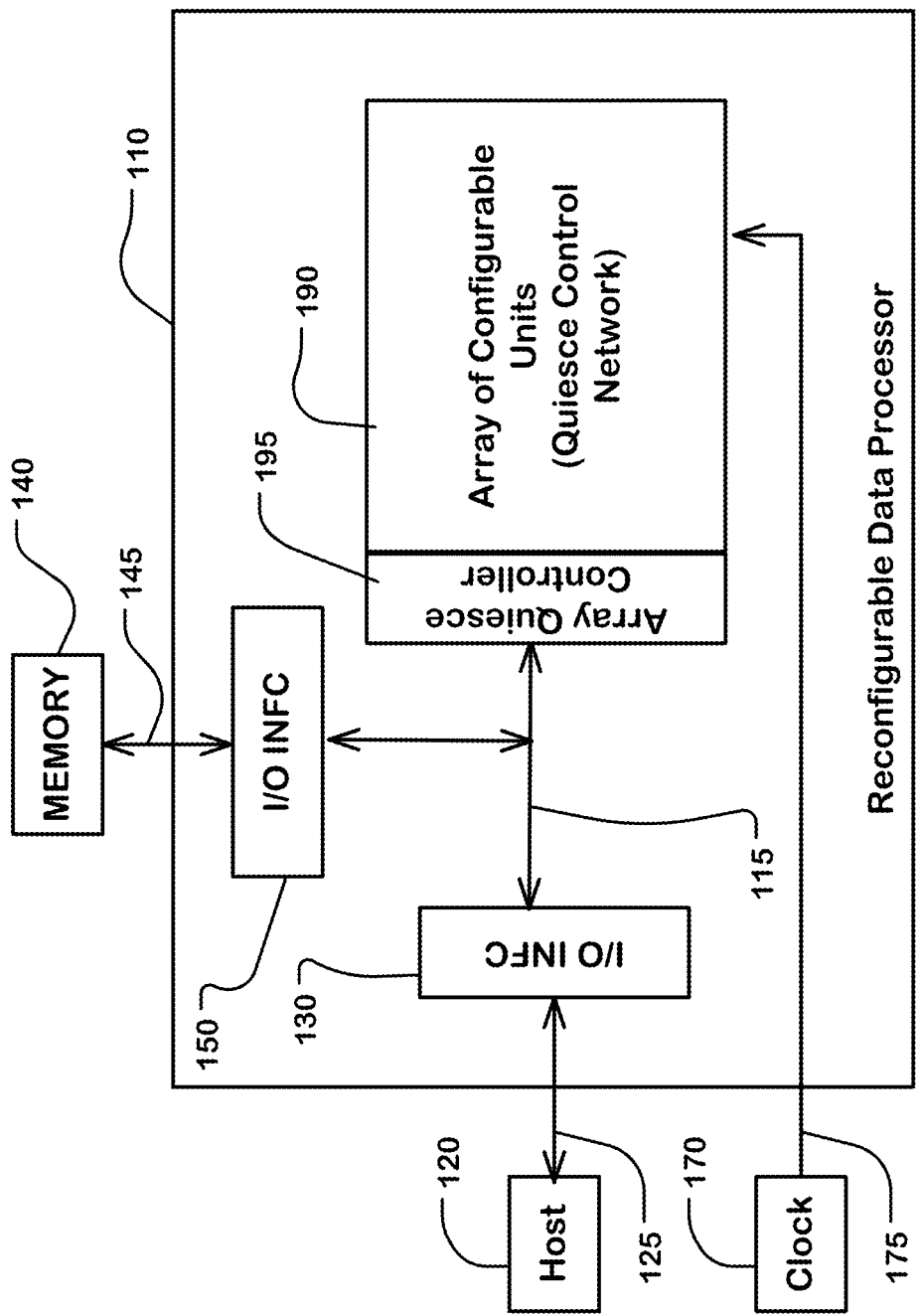
FIG. 1 is a system diagram illustrating a system including a host, a memory, and a reconfigurable data processor including a quiesce control network.

FIG. 1 is a system diagram illustrating a system including a host 120, a memory 140, and a reconfigurable data processor 110. As shown in the example of FIG. 1, the reconfigurable data processor 110 includes an array 190 of processing units that includes a quiesce control network as described herein. The processing units are configurable units in this example, configurable using a configuration file or bit file, to implement a data processing operation in a dataflow form, or partly in a data flow form. In other embodiments, arrays of processing units can be configured for von Neumann or control flow operations, or for hybrid operations.

The processing units of the array can execute asynchronously, which gives little in the way of guarantees on safe program points to quiesce.

In CGRAs and other processing systems that comprise an array of processing units configured for execution of a data processing operation, the array can be configurable to allocate sets of the processing units, termed herein "execution fragment resource groups EFRGs" in the array to implement different parts of the data processing operation, termed herein "execution fragments EFs" of the data processing operation. An array can be configured to execute a plurality of execution fragments, in different sets of processing units of the array. These different sets of processing units can perform the execution fragments for which they are configured asynchronously. Also, the processing units within a given set of processing units allocated for a single execution fragment can operate asynchronously, which supports, for example, the distributed nature of the processing units in the array. Thus, a problem arises when it is necessary to stop execution of the data processing operation and quiesce the processing units in the array in a manner that can be safely resumed.

For the purposes of this description, an execution fragment (EF) is, in general, a portion of a program implementing a data processing operation, comprising a set of operations, such as a sequence of operations in the program that follow a similar control flow sequence. An EF may be loop bodies, or operations that are executed based on a conditional construct such as an if-else or switch statement. An EF can be hierarchical, and can fully contain other loop nests. One concrete example is an EF defined at the outermost loop level in loop-heavy programs such as deep learning training and inference workloads. Using a control flow graph representation suitable for some implementations, if the program control flow graph G is represented by a set of edges E and vertices V, each unique EF is a distinct subgraph g of G that partitions G into distinct edges e and vertices v of G.

For the purposes of this description, an execution fragment resource group (EFRG) is the set of physical hardware resources allocated or configured to execute an EF. There can be a 1:1 correspondence between an EF and its EFRG; while EFRGs may be capable of, and may execute, multiple EFs in series, at any given time each component in an EFRG in a single-threaded deployment is only executing one EF. In an array of processing units, such as configurable units in a CGRA, an EFRG can comprise a set of processing units in the array.

For the purposes of this description, a quiesce boundary (QB) is an event that delineates sets of operations within an EF that are constrained to have a consistent state at the QB. For example, in a loop, a QB can be defined as following or preceding any wholly-executed loop iteration. Each EF has two natural QBs: one prior to the EF's execution, and another just after the EF has completed execution. Additional QBs can be defined and constructed within the EF as appropriate.

Some simple examples of a generic loop with comments locating QBs in the pseudocode, follow:
// generic loop
//One natural QB is here, immediately prior to the loop executing.
for (i=0; i<N; i++) {
c[i]=a[i]+b[i];
}
// Another natural QB is here, immediately following loop execution.
// generic loop
// each iteration may be a QB
for (i=0; i<N; i++) {
// The if statement below is effectively inserted by the compiler,
if (quiesce_received( )) wait( ); // wait( ) is a HW construct that waits for a resume/unload/etc.
c[i]=a[i]+b[i];
}
// generic loop
// each 4th iteration may be a QB
for (i=0; i<N; i++) {
// The if statement below is effectively inserted by the compiler,
if (!(i%4) && quiesce_received( )) wait( ); // wait( ) is a HW construct that waits for a resume/unload/etc.
c[i]=a[i]+b[i];
}

In order to implement QBs, the user can directly specify QBs to the compiler, or the compiler can insert QBs as appropriate by default to enable self-checkpointing or other capabilities like breakpoints based on user input. The user can specify QBs via compiler directives (pragmas) inserted into the code by the user, options specified by the user via the command-line invocation of the compiler, via a configuration file the compiler uses, some combination of these techniques, or some other means. The compiler, in a control flow embodiment, then transforms the original control flow graph G into G' by inserting additional edges and vertices which sample quiesce requests and synchronize/pause execution if a quiesce request is active at the QB. Within an EF, this synchronize/pause can be done by identifying producer(s) and consumer(s), and performing for example the following operations:
  a) Generate a producer barrier that is a logical function (e.g. AND) of all (initial) producers. The producer barrier may be constructed recursively if the number of producers is large.
  b) Generate a consumer barrier that is a logical function (e.g. AND) of all (end) consumers. The consumer barrier may be constructed recursively if the number of consumers is large.
  c) Denote one component for the EFRG that contains or is associated with a skew counter and associated controls. Route the quiesce request, producer barrier, and consumer barrier to this skew counter. Connect the producer barrier to the skew counter increment input, and the consumer barrier to the skew counter decrement input.
  d) The barrier logic in or associated with the denoted component in the EFRG in step c) above determines whether the producers of the EF should proceed with execution until the next QB, or halt and wait for all consumers to catch up to the same QB as the producers. To resume execution until the next QB, the participating component broadcasts a control signal to all producers. To halt execution, in one approach, this control signal is simply not sent out, which effectively blocks the EF from making progress. If a quiesce request has been received by the participating component, the producers will not receive the said control signal. The participating component waits for all consumers to reach the same QB as producers using the skew counter. When the skew counter reaches zero, the participating component produces a signal indicating that the EF is quiesce-ready.

In an array of configurable units, a data processing operation can be implemented by defining a plurality of execution fragments of the data processing operations. EFs may consist of a fixed or variable amount of work, as suits the program. Similarly, different EFs may contain different amounts of computation. EFs may represent parallel patterns, portions of parallel patterns or any other subset of operations in the program's control and data flow graph.

All or part of a data processing operation can be divided into a set of EFs. The array of configurable units is configurable using a configuration file to allocate an EFRG comprising a set of processing units having a plurality of members in the array to implement an execution fragment of a data processing operation. Many EFRGs and corresponding sets of configurable units can be allocated to respective execution fragments. EFs have inputs that receive input data from a set of producers of inputs. The set of producers of inputs may include one or many producers. EFs have functional elements distributed among the set of configurable units allocated to them that consume the input data, and produce results. The results produced by one EF may be utilized as inputs in a different EF.

Quiesce logic coupled to configurable units in the array is configurable to respond to a control signal to quiesce the set of data processing units in the array allocated for a particular execution fragment, on a quiesce boundary of the execution fragment. An execution fragment can be configured to include one quiesce boundary, or a plurality of quiesce boundaries, depending on the particular implementation.

Upon synchronization, the cycles corresponding to operations up to a quiesce boundary in the EFRG allocated to an EF are either fully executed, or not executed at all.

An array of processing units can be considered quiesced, after all the units in the array have reached a quiesce boundary in the EFs for the EFRGs to which they are allocated, and execution in the array can be halted in a safe manner for the particular implementation.

For example, a quiesced EFRG or a quiesced array can have the following characteristics:
  1. No new computation is being performed, and no new transactions are being created.
  2. All pertinent in-flight transactions (data and control bits) are complete and have reached their destinations.
  3. All pertinent program state and intermediate data are stored in state elements and memory in the configurable processing units that can be unloaded during a program unload operation.

As shown in the example of FIG. 1, the reconfigurable data processor 110 includes an array 190 of configurable units (processing units) and an array quiesce controller 195, which can be used in checkpoint and restore operations, breakpoint operations, and other operations. The quiesce controller can include or be coupled with a configuration load/unload controller, which can include a combination of a configuration load controller and a configuration unload controller. The configuration load controller and the configuration unload controller may be implemented using separate logic and data path resources, or may be implemented using shared logic and data path resources as suits a particular embodiment.

The processor 110 includes an external I/O interface 130 connected to the host 120 by lines 125, and external I/O interface 150 connected to the memory 140 by lines 145. The I/O interfaces 130, 150 connect via a bus system 115 to the array 190 of configurable units. The bus system 115 may have a bus width of carrying one chunk of data which can be, for this example, 128 bits (references to 128 bits throughout can be considered as an example chunk size more generally).

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the reconfigurable processor 110. The configuration file can be retrieved from the memory 140 via the memory interface 150. Chunks of the configuration file can then be sent in a distribution sequence to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external data I/O interfaces.

A quiesce control network can be included which is configurable to establish control signal routes among the configurable units usable for coordination of the execution fragments. The quiesce control network is configurable in configurable and reconfigurable architectures to provide signal routing suitable to support complex data processing operations in an array of configurable units, including for example in configurable units of a CGRA processor.

The quiesce control network provides the ability to register or record inbound tokens and status signals from several distinct sources on the CGRA, which can be defined in a configuration data store, and produce output barrier tokens, and other signals, based on specified combinations of the inbound tokens and status signals. Examples described herein are flexible enough to support control barriers across an arbitrary number of sources by decomposing the barrier logic into multiple levels.

A quiesce control network as described herein can be utilized with other types of data processors that include an array of processing units which perform execution fragments that may require coordination for the purposes of a broader data processing operation.

FIG. 1 shows a processing system, comprising an array of reconfigurable units and interconnect, configurable to execute a data processing operation; and quiesce logic coupled to reconfigurable units in the array, configurable to quiesce the array in response to a control signal. The control signal can be generated in response to an internal event originating in the array. The control signal can be generated in response to an external event originating outside the array.

The host processor as shown in FIG. 1, can execute a runtime program with multitasking, and the control signal to induce the quiesce, can be generated in support of the multitasking.

The host processor as shown in FIG. 1, can execute a runtime program with multitasking, and the control signal to induce the quiesce, can be generated in support of the checkpointing.

The host processor as shown in FIG. 1, can execute a runtime program with multitasking, and the control signal to induce the quiesce, can be generated in response to an event originating inside the array, and the runtime program can reconfigure the array after the quiesce in support of the multiprogramming.

Figure 2:
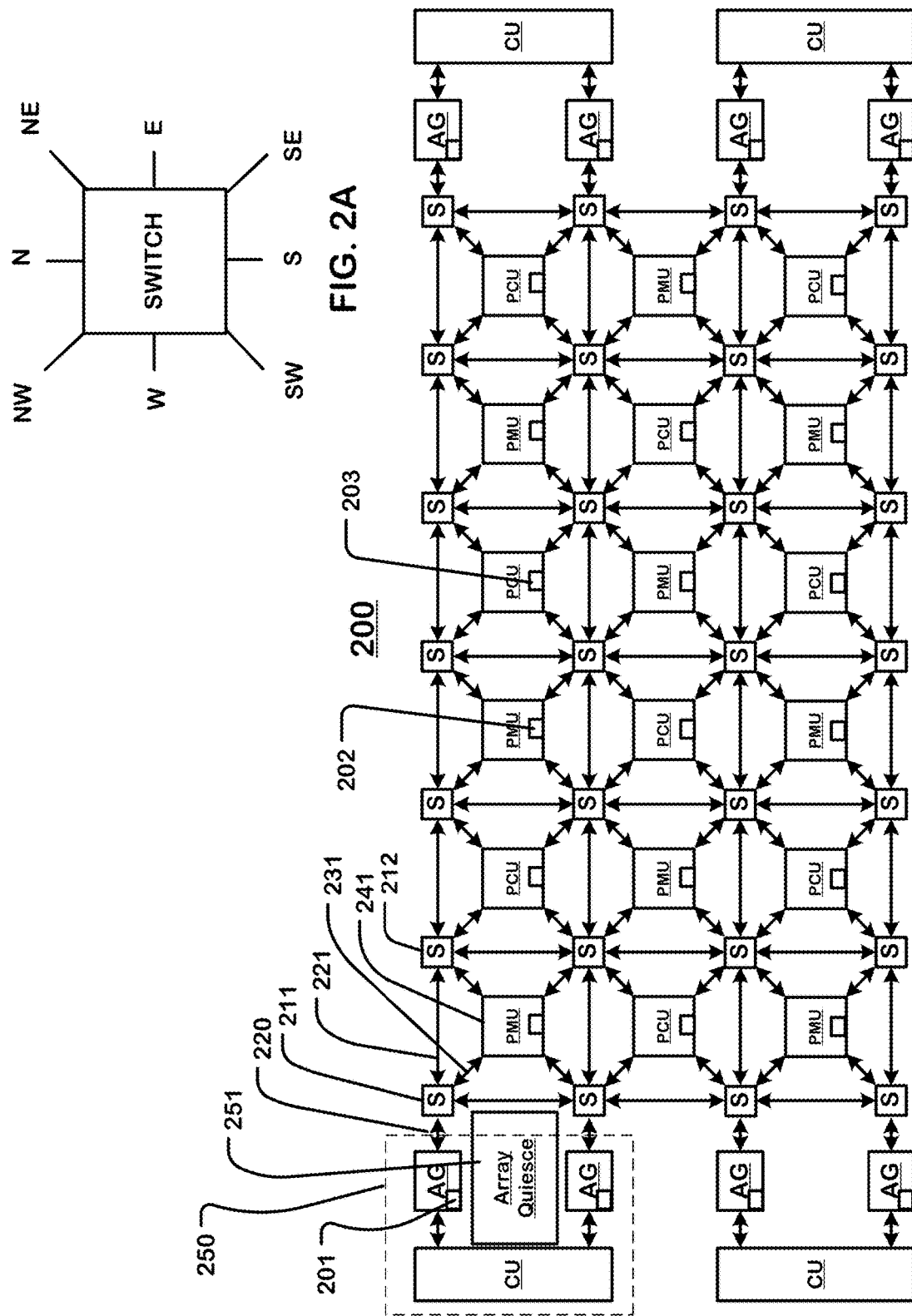
FIG. 2 is a simplified diagram of a tile comprising an array of configurable units with an array quiesce controller and distributed quiesce logic.
Figure 9:
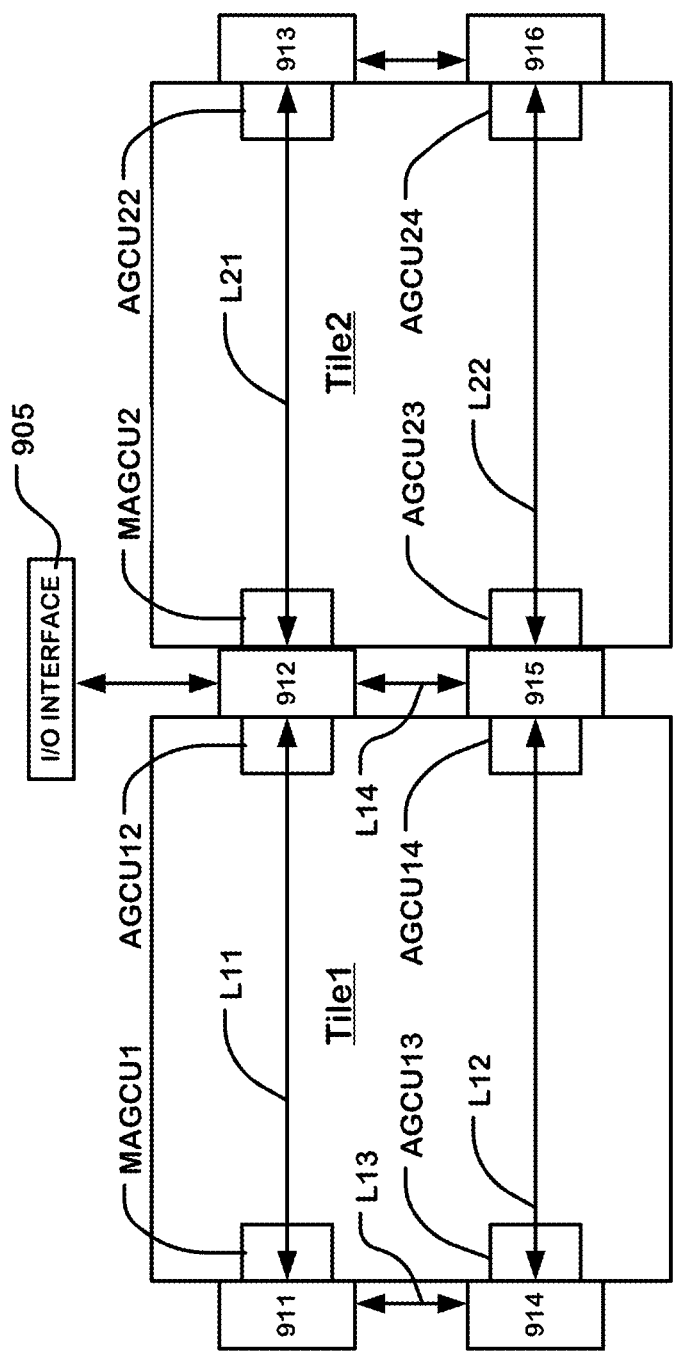
FIG. 9 is a simplified block diagram of a top level network and components of a CGRA (Coarse Grain Reconfigurable Architecture) supporting embodiments with multiple tiles.

FIG. 2 is a simplified diagram of a tile that comprises an array of configurable units, where the configurable units in the array are nodes on a data bus system, which in multi-tile embodiments can be configured as an array level network, coupled to a higher level or top level network which is set up for communications among tiles and with the external interfaces on the device (See, FIG. 9).

In this example, the array of configurable units 200 includes a plurality of types of configurable processing units. The types of processing units, in this example, include Pattern Compute Units (PCU), Pattern Memory Units (PMU), switch units (S), and Address Generation and Coalescing Units (AGCU) (each including two address generators AG and a shared CU). For an example of the functions of these types of configurable units, see, Prabhakar et al., "Plasticine: A Reconfigurable Architecture For Parallel Patterns", ISCA'17, Jun. 24-28, 2017, Toronto, ON, Canada, which is incorporated by reference as if fully set forth herein. In the architecture shown in FIG. 2, a master AGCU 250 includes an array quiesce controller 251 which controls quiesce operations for the array of configurable units in the tile.

A data processing operation (sometimes called a "machine"), implemented by configuration of a tile, comprises a plurality of execution fragments of the data processing operation which are distributed among and executed by corresponding sets of configurable units (AGs, CUs, PMUs, PCUs in this example).

Components of the array participating in the quiesce process honor quiesce requests from the array quiesce controller 251 in a master AGCU 250 (MAGCU) at EF quiesce boundaries. In examples described below, synchronization between producers and consumers at each EF quiesce boundary is achieved using two constructs: producer-barrier (p_barrier), and consumer-barrier (c_barrier) which can be linked to the configurable units using a control barrier network. Quiesce logic in the array can be implemented by configuration of the control barrier network, by separate dedicated logic and communication links, or by a combination of the control barrier network and dedicated logic and links.

A control barrier network, usable as a quiesce control network, in this example comprises a plurality of configurable quiesce logic units (including barrier logic units) coupled with the configurable units in the array. In this example, the plurality of quiesce logic units includes logic units (e.g. 201) in or operatively coupled to the address generators AG, logic units (e.g. 202) in the PMUs, and logic units (e.g. 203) in the PCUs. The control barrier network for a given data processing operation can be configured to enforce relationships among the execution fragments, to coordinate timing of the ending and the beginning of the performance of the execution fragments distributed across the tile, and to support quiesce processes as described herein.

Figure 3:
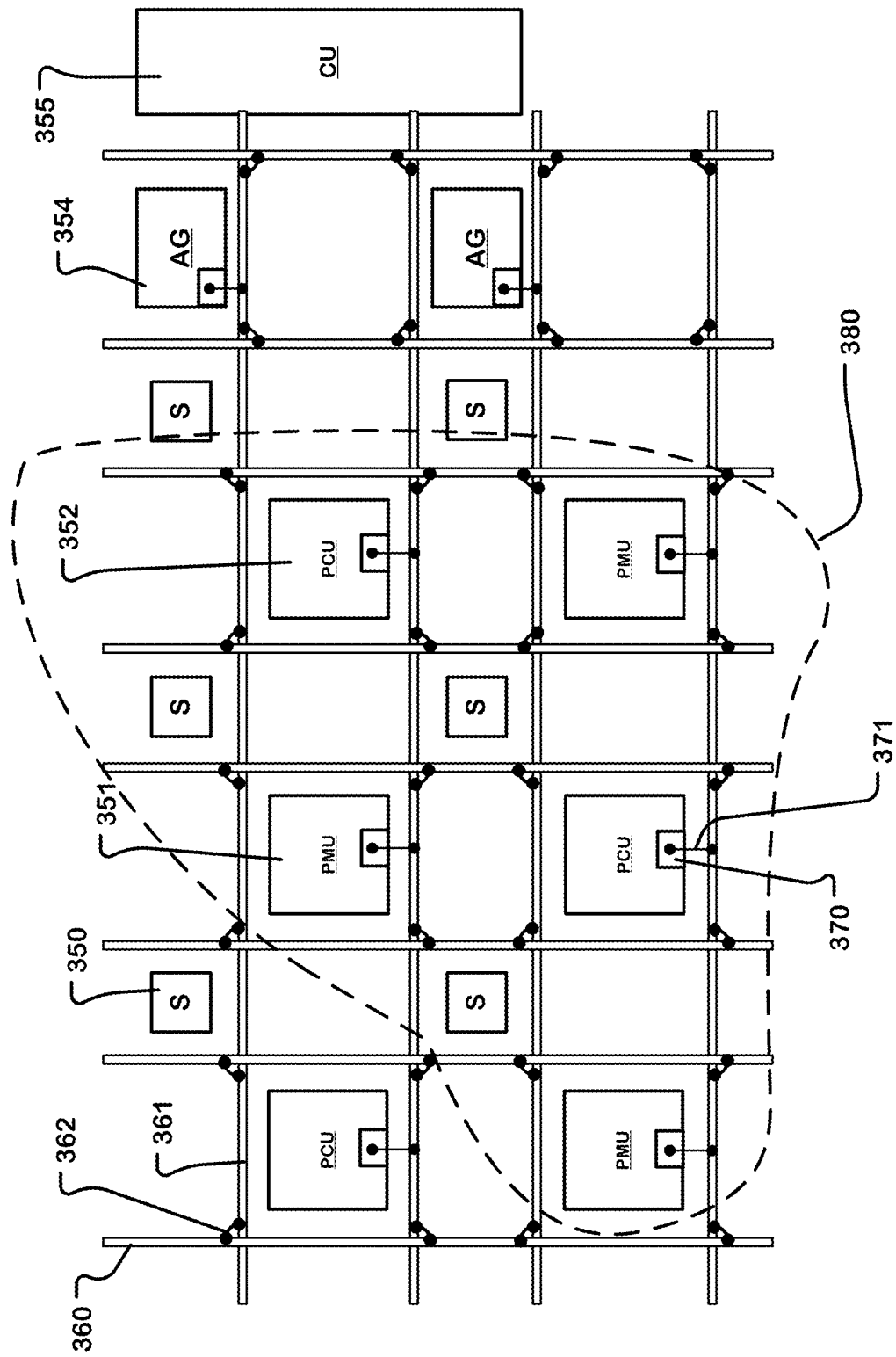
FIG. 3 is a diagram of a set of processing units of a tile like that of FIG. 2, illustrating a configurable interconnect connected to quiesce logic in the tile.

The quiesce logic units are connected to a control bus that, in this example, is implemented using a configurable interconnect (not shown—see FIG. 3). The control bus can be configured using configuration data to form signal routes among the quiesce/barrier logic units in the tile supporting a particular configuration of the tile designed for performing a data processing operation, including a plurality of sets of configurable units allocated to respective execution fragments.

Each of these configurable units contains a configuration store comprising a set of registers or flip-flops storing configuration data that represent either the setup or the sequence to run an execution fragment to which it is allocated, and can include the number of nested loops, the limits of each loop iterator, the instructions to be executed for each stage, the source of the operands, and the network parameters for the input and output interfaces. The configuration data can also include data that defines quiesce boundaries in the various execution fragments.

Additionally, each of these configurable units contains a configuration store comprising a set of registers or flip-flops that store a status usable to track progress in nested loops or otherwise. A configuration file contains a bit stream representing the initial configuration, or starting state, of each of the components that execute the program. This bit stream is referred to as a bit file.

The bus system includes links interconnecting configurable units in the array. The links in the array level network include one or more, and in this case two, kinds of physical data buses: a chunk-level vector bus (e.g. 128 bits of data), and a word-level scalar bus (e.g. 32 bits of data). For instance, interconnect 221 between switch units 211 and 212 includes a vector bus interconnect with a vector bus width of 128 bits, and a scalar bus interconnect with a scalar bus width of 32 bits. Also a control bus (see FIG. 3) that can comprise a configurable interconnect, or a combination of dedicated and configurable interconnects, is included carrying multiple control bits on signal routes designated by configuration bits in the configuration file for the tile. The control bus can comprise physical lines separate from the data buses in some embodiments. In other embodiments, the control bus can be implemented using the same physical lines with a separate protocol or in a time sharing procedure, and as a virtual bus executing on the shared hardware with the data buses.

The buses can differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. A configuration load/unload controller can generate a header for each chunk of configuration data of 128 bits. The header is transmitted on a header bus to each configurable unit in the array of configurable units.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.

Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the one or more of the configuration data, state register data, and working memory in quiesced configurable units, in order, to the memory. For both load and unload operations, the shifting in the configuration serial chains in a configuration data store in a configurable unit in this example is from LSB (least-significant-bit) to MSB (most-significant-bit), or MSB out first.

FIG. 2A illustrates an example switch unit connecting elements in an array level network. As shown in the example of FIG. 2A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. Two switch units in each tile quadrant have connections to an Address Generation unit and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of an execution fragment of a machine after configuration, data can be sent via one or more unit switches and one or more links between the unit switches to the configurable units using the vector bus and vector interface(s) of the one or more switch units on the array level network.

In one embodiment, the configurable units include configuration and status registers holding unit configuration files loaded in a configuration load process, or unloaded in a configuration unload process. The registers can be connected in a serial chain and can be loaded through a process of shifting bits through the serial chain. In some embodiments, there may be more than one serial chain arranged in parallel or in series. When a configurable unit receives the, for example, 128 bits of configuration data in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface.

A configuration file or bit file, before configuration of the tile, can be sent using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 241 can be sent to the PMU 241, via a link 220 between a load controller in the address generator AG and the West (W) vector interface of the switch unit 211, and a link 231 between the Southeast (SE) vector interface of the switch unit 211 and the PMU 241. Configuration data for the control barrier network can be included in the configuration data for associated configurable units, or provided via other configuration data structures.

The configurable units interface with the memory through multiple memory interfaces. Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

Configuration files can be loaded to specify the configuration of the tile including EFRGs, quiesce/barrier logic units and the control bus, for the purposes of particular data processing operations, including execution fragments in the configurable units, interconnect configurations and control barrier network configurations. Technology for coordinating the loading and unloading of configuration files is described in commonly owned U.S. patent application Ser. No. 16/197,826, filed Nov. 21, 2018, entitled Configuration Load of a Reconfigurable Data Processor, by Shah et al., which is incorporated by reference as if fully set forth herein.

FIG. 3 illustrates a portion of the tile (upper right portion of FIG. 2), with the data network removed, and shows a part of the control bus, including the configurable interconnect usable for forming signal routes among the quiesce/barrier logic units. The plurality of configurable units in the illustrated portion of the array includes switches S (e.g. 350), PMUs (e.g. 351), PCUs (e.g. 352), AGs (354) and a CU (355). Quiesce/barrier logic units (e.g. 370) are included in configurable units in the array. In this example, all of the configurable units except the switches S and the coalescing unit CU include quiesce/barrier logic units. In other examples, different distributions of the quiesce/barrier logic units can be utilized, including examples in which the logic units are connected to more than one configurable unit in the array, and examples in which the logic units are connected to all the configurable units (e.g. including the S and CU type units in the illustrated example). A quiesce/barrier logic unit is associated with a configurable unit in the array if it is connected for exchange of control signals and tokens, or configurable to be so connected to the configurable unit by a configuration file during operation of an execution fragment to which the configurable unit is allocated.

The configurable interconnect is illustrated by a grid of vertical conductors (e.g. 360) intersected by horizontal conductors (e.g. 361). Switch boxes (e.g. 362) are set by configuration data to interconnect specific lines or sets of lines in the horizontal conductors with the vertical conductors at each intersection. Likewise, each of the configurable units can include inputs and outputs (not shown) for control signals to be routed using the configurable interconnect that can be configured to connect to particular lines in the horizontal and vertical conductors.

In this embodiment, each of the quiesce/barrier logic units (e.g. 370) includes a plurality of inputs and outputs (e.g. 371) which are configurable for connection to particular lines in the horizontal conductors of the interconnect. In the illustration, the connections between the quiesce/barrier logic units in the configurable interconnect are made with horizontal conductors in the configurable interconnect. This illustration does not suggest any limitation on the implementation and distribution of configurable connections that can be made with the configurable interconnect and the control network in or associated with the quiesce/barrier logic units.

The configurable switches can be implemented generally using pass gates with control inputs connected to a register storing a bit of the configuration file for the quiesce/barrier logic unit. In some embodiments, the configurations form static routes persistent throughout execution of a data processing operation, or of an execution fragment, among the inputs and outputs of the quiesce/barrier logic units to establish control barrier networks implemented to support quiesce and other particular data processing operations and to support control of the execution fragments distributed among the configurable units of the tile to support the data processing operations. In other embodiments, the configurations may form dynamic routes that change according to the phase of execution of the program, or as a result of control flow predicates (if-then-else constructs), or other dynamic, input-dependent operations that represent control-flow-dependent sequencing of execution fragments An execution fragment can be allocated to an EFRG including one or more configurable units, which define a set of configurable units, where the sets can have multiple members distributed spatially across the tile. The spatial distribution can result in asynchronous operations among the units in the EFRG, due to variant latencies, variant jobs at each unit, variant dependencies and so on.

For example, an execution fragment can be allocated to a set of configurable units (e.g. 380) including one or more PMU and one or more PCU. Also, an execution fragment can be allocated to a set of configurable units including one or more AG or AGCU, one or more PMU and one or more PCU. Among the configurable units in a set of configurable units, some units are configured as producers of inputs and others are configured as consumers. For example, one set of configurable units allocated to an execution fragment can include two PMUs acting as producers providing inputs to one PCU acting as a consumer, the outputs of which may be stored in a third PMU or in memory on the PCU. The quiesce logic and control barrier network can be configured to link the configurable units in each set allocated to a particular execution fragment for the purposes of quiesce.

Figure 4:
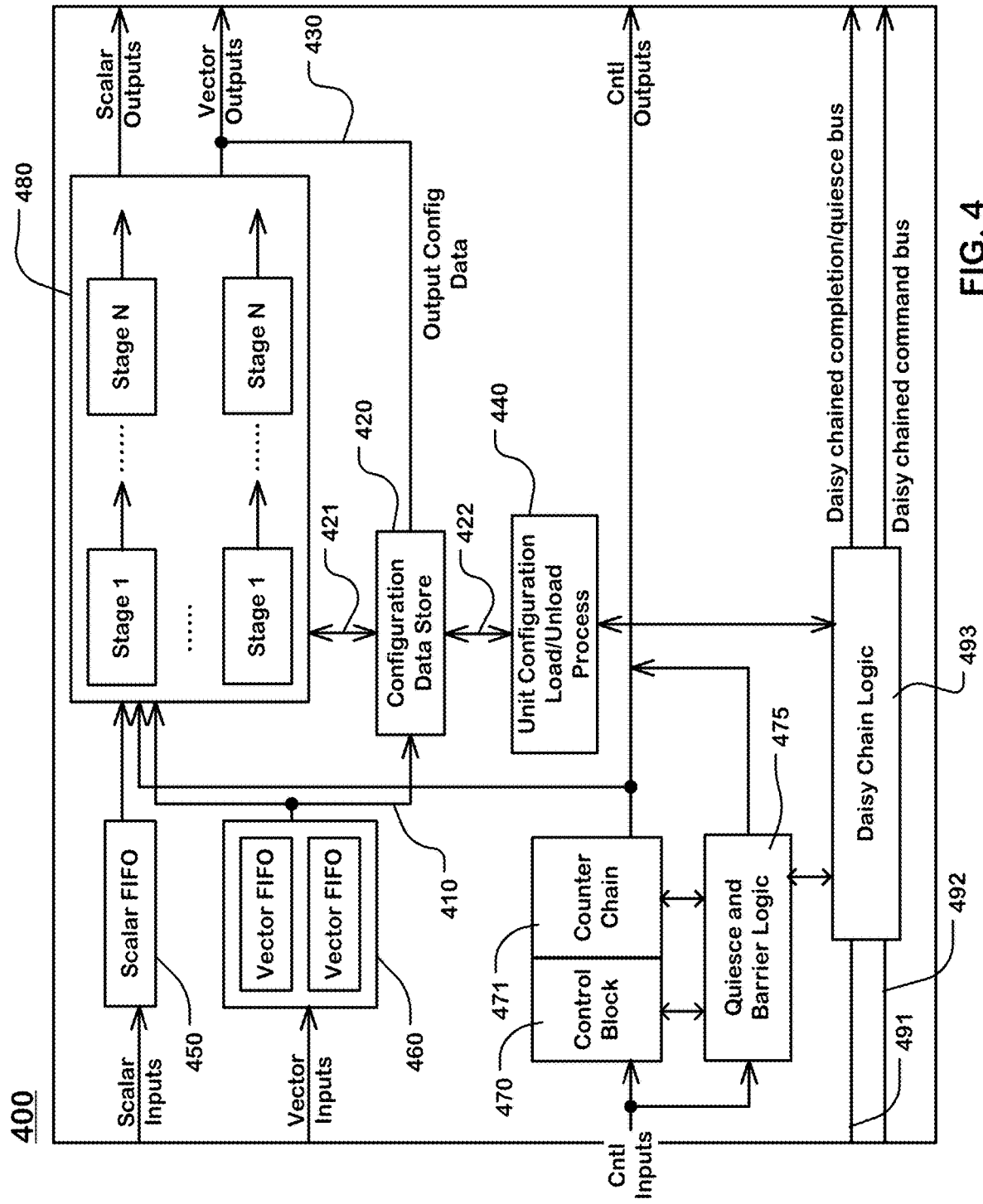
FIG. 4 is a block diagram illustrating an example configurable unit including quiesce logic.

FIG. 4 is a block diagram illustrating an example configurable unit 400, such as a Pattern Compute Unit (PCU). Configurable units in the array of configurable units include configuration data stores 420 (e.g. serial chains) to store unit files comprising a plurality of chunks (or sub-files of other sizes) of configuration data particular to the corresponding configurable units and the associated quiesce/barrier logic units 475. Configurable units in the array of configurable units each include unit configuration load/unload logic 440 connected to the configuration data store 420 via line 422, to execute a unit configuration load process. The unit configuration load process includes receiving via the bus system (e.g. the vector inputs), chunks of a unit file particular to the configurable unit, and loading the received chunks into the configuration data store 420 of the configurable unit.

The configuration data stores 420 in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

A configurable unit can interface with the scalar, vector, and control buses using three corresponding sets of inputs and outputs (I/O): scalar inputs/outputs, vector inputs/outputs, and control inputs/outputs. Scalar I/Os can be used to communicate single words of data (e.g. 32 bits). Vector I/Os can be used to communicate chunks of data (e.g. 128 bits), in cases such as receiving configuration data in a unit configuration load process, and transmitting and receiving data during operation after configuration across a long pipeline between multiple PCUs. Control I/Os can be used to communicate control signals such as the start or end of execution of a configurable unit. Control inputs are received by control block 470, and control outputs are provided by the control block 470.

Each vector input is buffered using a vector FIFO in a vector FIFO block 460 which can include one or more vector FIFOs. Each scalar input is buffered using a scalar FIFO 450. Using input FIFOs decouples timing between data producers and consumers, and simplifies inter-configurable-unit control logic by making it robust to input delay mismatches.

Input configuration data 410 can be provided to a vector FIFO as vector inputs, and then be transferred to the configuration data store 420. Output configuration data 430 can be unloaded from the configuration data store 420 using the vector outputs.

The array uses a daisy-chained completion/quiesce ready bus to indicate when a load/unload command has been completed, and to communicate quiesce ready signals as discussed below. The master AGCU transmits the quiesce, and program load and unload commands, to configurable units in the array of configurable units (to transition from S0 to S1, FIG. 10) over a daisy-chained command bus. As shown in the example of FIG. 4, a daisy-chained completion/quiesce ready bus 491 and a daisy-chained command bus 492 are connected to daisy chain logic 493, which communicates with the unit configuration load/unload logic 440. The daisy chain logic 493 can include load/unload complete and quiesce ready status logic, as described below. The daisy-chained completion bus is further described below. Other topologies for the command and completion/quiesce ready buses are clearly possible but not described here.

The configurable unit in this example includes multiple reconfigurable datapaths in block 480. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via lines 421.

The PCU in the illustrated example is designed to execute parts of execution fragments of a data processing operation, which can comprise a single, innermost parallel pattern in an application, or other pattern suitable for control using the quiesce and control barrier network. The PCU data path can be organized as a multi-stage, reconfigurable SIMD pipeline. This design enables each PCU to achieve high compute density, and exploit both loop level parallelism across lanes and pipeline parallelism across stages. Each stage (Stage 1 . . . Stage N) of each SIMD lane can be composed of a functional unit (FU) and associated pipeline registers. The FUs can for example perform 32 bit word level arithmetic and binary operations, including support for floating point and integer operations. As the FUs in a single pipeline stage operate in SIMD, each stage requires, in an example embodiment, only a single configuration register. Results from each FU are written to its associated register.

Pipeline registers in each lane can be chained together across pipeline stages to allow live values to propagate between stages within the same lane. Cross lane communication between FUs can be captured using two types of intra-PCU networks. A reduction tree network that allows reducing values from multiple lanes into a single scalar, and a shift network which allows using PRs as sliding windows across stages to exploit reuse in stencil applications. Both networks use dedicated registers within PRs to minimize hardware overhead.

Each vector I/O (e.g. vector FIFOs 460) allows communicating one word per lane in the PCU, and is used in cases such as reading and writing to scratchpads in PMUs and transmitting intermediate data across a long pipeline between multiple PCUs. Using input FIFOs decouples data producers and consumers, and simplifies inter-PCU control logic by making it robust to input delay mismatches. The FIFOs 450, 460 can generate status signals, such as FIFO empty or FIFO not empty signals, which are connected to the control block 470, and other circuits in the units, and usable to indicate status of an execution fragment, such as whether required input data is available in the FIFO.

Control I/O (Cntl Inputs, Cntl Outputs) is connected to a control block 470, and used to communicate control signals such as the start or end of execution of a PCU, or to indicate backpressure.

A reconfigurable chain of counters 471 generates pattern iteration indices and status and control signals that can be used to indicate the status of an execution fragment and can be used to coordinate execution among the elements of the configurable unit. The counter chain 471 for example can generate counter done signals that can be used to indicate the status of the execution fragment, such as a number of cycles of the execution fragment such as an iterations in a loop, or a loop including a number of iterations, quiesce boundaries and whether a loop in the execution fragment is complete (all cycles of the loop executed).

Execution of an execution fragment in the PCU can be enabled when the control block 470 enables one of the counters. Based on the application's control and data dependencies, the control block can be configured to combine multiple status signals from both local FIFOs and global control inputs to trigger PCU execution. The control block 470 can be implemented using reconfigurable combinational logic and programmable up-down counters for state machines.

Quiesce/barrier logic 475 is included in this example of a configurable unit. The quiesce/barrier logic 475 can be part of the control block 470, or implemented as a separate block on the device. The quiesce/barrier logic 475 is coupled to the control inputs and to the control outputs. Also, the quiesce/barrier logic 475 is coupled to the control block 470 and the counter chain 471, for exchanging status signals and control signals in support of array wide quiesce logic and a control barrier network configured as discussed above.

A Pattern Memory Unit (e.g. PMU) can contain scratchpad memory coupled with a reconfigurable scalar datapath intended for address calculation and other scalar computations, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU. A PMU can also include a quiesce/barrier logic unit configured to exchange status and control signals with elements of the PMU, and be usable for quiesce and to enable an execution fragment in the PMU. In addition, an address generator AG in this example can also include a quiesce/barrier logic unit configured to exchange status and control signals with elements of the AG, and usable for quiesce and to enable an execution fragment in the AG.

Figure 5:
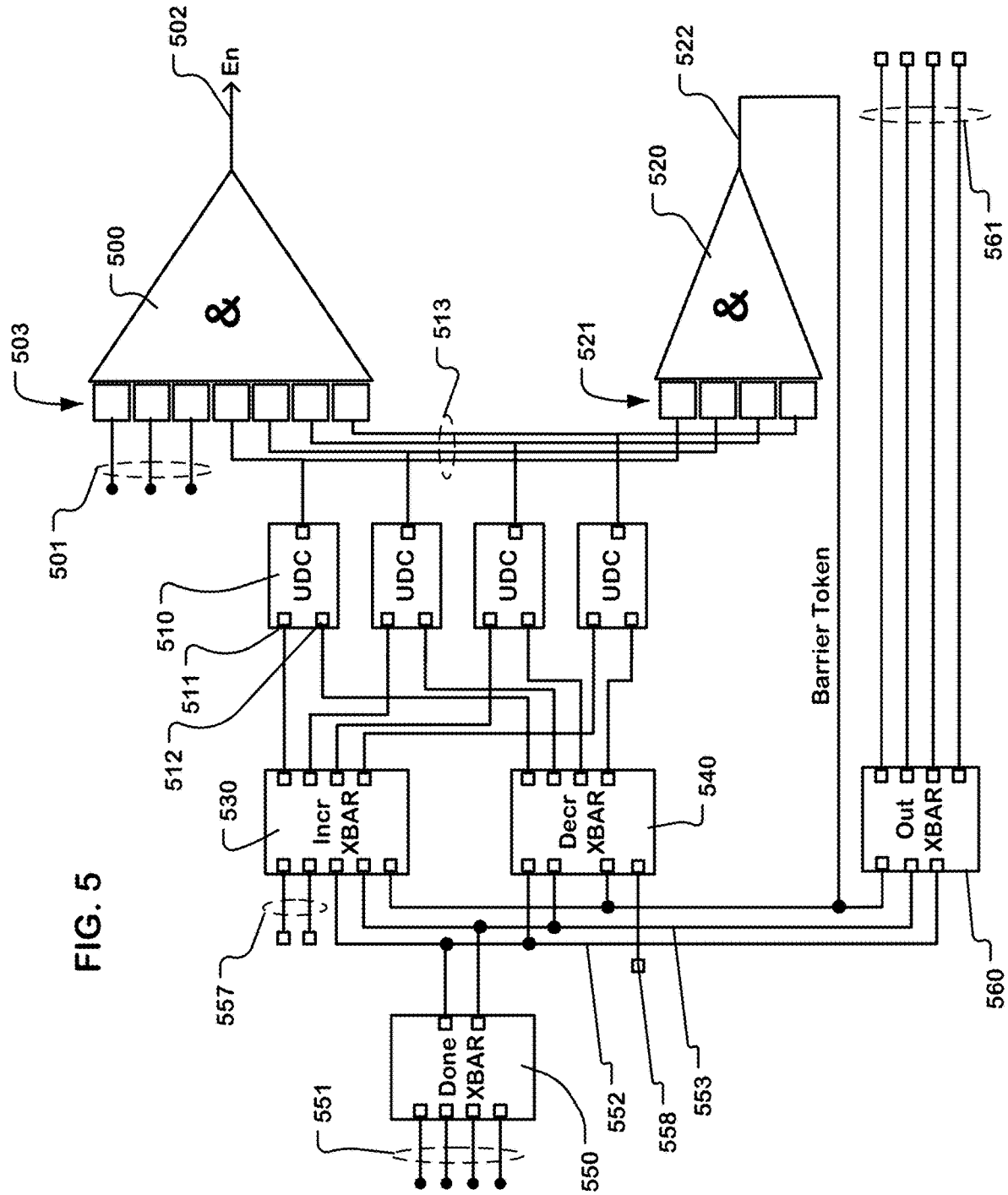
FIG. 5 is a diagram of an implementation of a barrier logic unit configurable to support quiesce.

FIG. 5 illustrates an example of a quiesce/barrier logic unit, usable in an array of configurable units to form a configurable control barrier network as described herein. Using a plurality of logic units like that of FIG. 5, in or associated with configurable units in the array, the control barrier network can be constructed recursively to support complex EFRGs. The example in FIG. 5 is usable for example as the quiesce/barrier logic 475 of FIG. 4. The quiesce/barrier logic unit of FIG. 5 includes inputs (e.g. 501, 551, 557) and outputs (e.g. 502, 561) which are connected to the control bus (configurable interconnect of FIG. 3) and an associated configurable unit, such as a PCU, PMU, AG of the examples described above.

The quiesce/barrier logic unit includes a token store that comprises in this example a plurality of up/down counters UDC (e.g. 510). In other embodiments, different types of latches, such as set/reset SR latches and the like, can be used to implement the token store. In still other embodiments, various implementations of FIFO buffers can be used to implement the token store. Each of the UDCs has an increment input (e.g. 511) and a decrement input (e.g. 512). The increment input can be used to change a logic 0 stored in the UDC to a logic 1, or in other words to set the value in the token store. The decrement input can be used to change the logic 1 stored in the UDC to a logic 0, or in other words to reset the value in the token store. The UDCs can be configured as one-bit counters, or multiple-bit counters.

The token store is coupled to a configurable input circuit, which in this example comprises a plurality of configurable crossbar switches. A status crossbar 550 of the configurable input circuit has inputs 551 connected to signals usable to indicate the status of an execution fragment in a configurable unit in the array. In this example, the status signals can comprise quiesce boundary counter done signals from the plurality of counters in the associated configurable unit that can be used to indicate the status of an execution fragment. The status crossbar 550 includes outputs 552, 553 which are connectable to an increment crossbar 530 and a decrement crossbar 540.

The increment crossbar 530 of the configurable input circuit provides increment signals to each of the UDCs in the token store, and has inputs 557 connected to the configurable interconnect of the control bus, and inputs connected to the outputs of the status crossbar 550. Thus, each UDC has an increment signal based on a configurable selection of outputs from the status crossbar 550 and from the configurable interconnect inputs 557. The increment crossbar also has an input connected to receive a barrier token on line 552 generated by barrier logic 520 as discussed below.

The decrement crossbar 540 of the configurable input circuit provides decrement signals to each of the UDCs in the token store, and has an input 558 (or inputs) connected to the configurable interconnect of the control bus, and inputs connected to the outputs 552, 553 of the status crossbar 550. Thus, each UDC has a decrement signal based on a configurable selection of outputs from the status crossbar 550 and from the configurable interconnect inputs 558. The decrement crossbar also has an input connected to receive a barrier token on line 552 generated by barrier logic 520 as discussed below.

The quiesce/barrier logic unit includes enable logic 500 (AND tree) including a configurable enable mask 503 which generates an enable signal on line 502 for connection to an associated configurable logic unit based on a configurable combination of the signals in the token store and status signals from the associated configurable logic unit. For example, the enable signal on line 502 can be provided to the control block 470 of FIG. 4, which can include logic to generate control signals for the PCU utilizing the enable signal on line 502 to start and stop execution fragments. The inputs to the enable logic 500 include status signals on line 501 from the associated configurable unit, such as FIFO-not-empty signals, and the like. Also, inputs to the enable logic 500 can include the outputs (e.g. 513) of the token store. The enable signal on line 502 therefore can be generated based on a configurable combination of the outputs of the token store. Also the enable signal on line 502 can be generated based on the configurable combination of the outputs of the token store and status signals from the associated configurable unit.

The quiesce/barrier logic unit includes barrier token logic 520 including a configurable barrier mask 521 which generates a barrier token on line 522 based on a configurable combination of the signals on lines 513 stored in the token store. The barrier token on line 522 is fed back as a feedback signal to the decrement crossbar 540, usable to reset the token store, for example. Also, the barrier token on line 522 is applied as an input to the increment crossbar 530 in this example, usable as a condition for setting a value in the token store. The barrier token can act as a producer barrier (p_barrier) token or as a consumer barrier (c_barrier) token according to the configuration file.

The quiesce/barrier logic unit includes an output crossbar 560. The inputs to the output crossbar in this example include the barrier token on line 522, including a p_barrier or a c_barrier, and status signals output by the status crossbar 550. Other inputs can be provided to the output crossbar 560 as well in other implementations. The output crossbar is configurable to apply the barrier token from line 522 and other signals to selected lines 561 on the configurable interconnect. The selected lines 561 on the configurable interconnect can be configured in a signal route that supplies the barrier token as an input (e.g. input 557) of another quiesce/barrier logic unit in the control barrier network of the configurable logic array. The selected lines 561 on the configurable interconnect can be configured in a signal route that supplies a status signal (e.g. signals 552, 553) from one of the configurable units as an input (e.g. input 557) of another quiesce/barrier logic unit in the control barrier network of the configurable logic array.

Utilizing a quiesce/barrier logic unit like that of FIG. 5, the barrier operation works as follows. Each unit can be configured to implement a barrier across all the signals that can increment the UDCs. This includes the external control inputs from the control bus sourced from outside the associated configurable unit, and internal status signals like counter done signals sourced from inside the associated configurable unit. To implement a barrier across a subset of these signals, the configuration file reserves one zero-initialized UDC in the token store for each signal in the subset. The crossbars are configured to route the required signals to their respective UDCs which increment inputs via the increment crossbar 530. Next, a barrier mask is configured to select the reserved UDCs. The mask selects the UDCs that participate in an AND tree. The output of the AND tree is a 1-bit barrier token which, for example, goes high when all the UDCs in the mask have a value greater than zero. The barrier token can be configured to decrement all the UDCs participating in the barrier, by selecting line 522 at the decrement crossbar 540. This can be used to ensure that the barrier signal is high for only one cycle for every set of input tokens, thus producing one output token. In this configuration, the barrier token is used for the purposes of resetting the token store. In other embodiments, different signals can be used for that purpose. Also, the barrier token can be used to reset only one bit, or only some of the bits, in the token store, rather than all bits. The resulting barrier token is sent out on the control output by programming the "out" crossbar 560. This token can then be used as required by the program, e.g., input to the next stage of computation, or to the next barrier node, etc. In some cases, the barrier token may have to be sent to the node locally as well. To facilitate this use case, the barrier token is also an entry into the increment Xbar 530 which can increment other UDCs.

This provides maximum flexibility to software to implement barriers close to the consumers of the barrier tokens to better utilize resources.

Control tokens from multiple sources in an array of configurable units often need to be synchronized at a barrier, where a single token (control pulse) is produced after receiving one token from each source, allowing recursive and hierarchical control networks.

Figure 6:
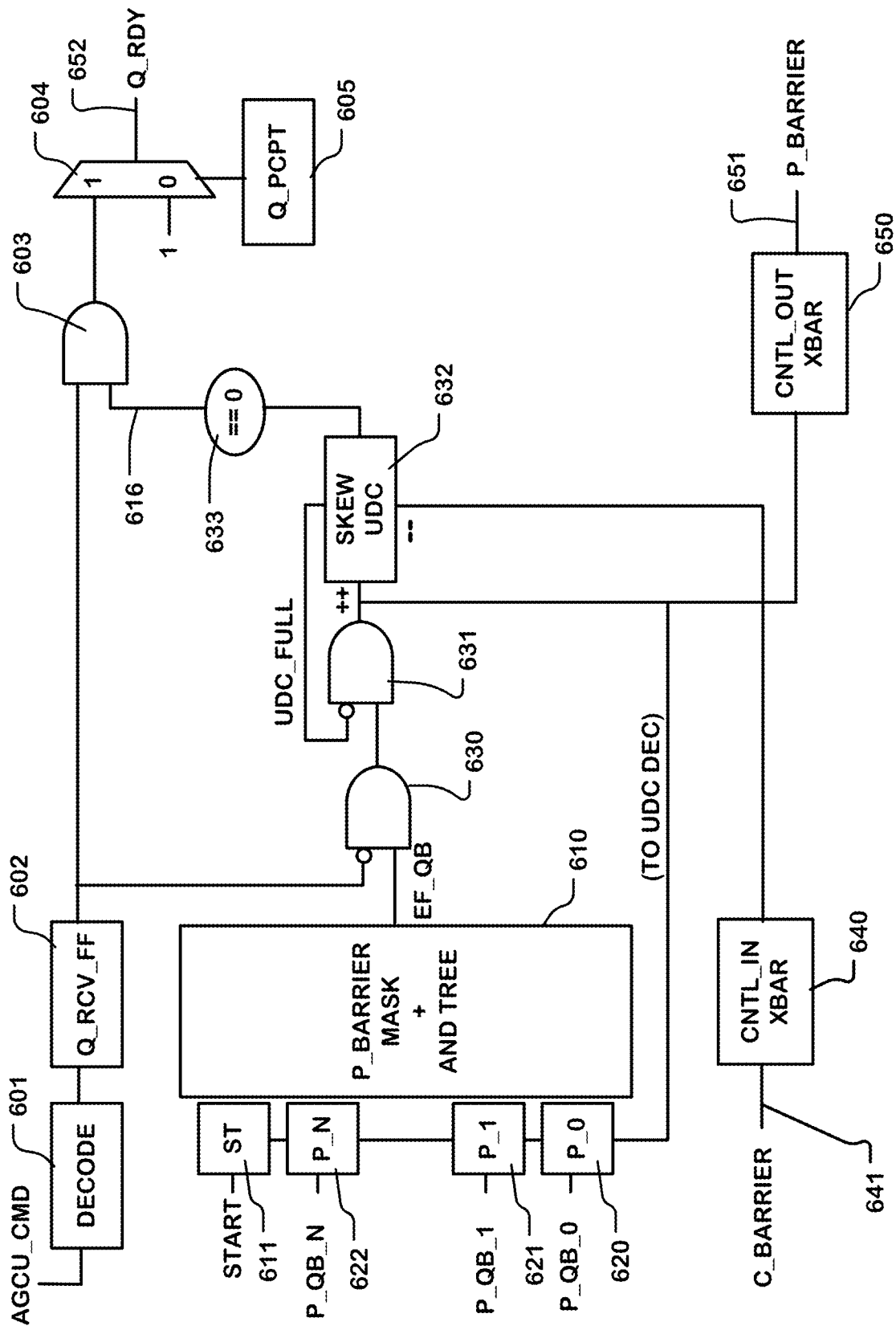
FIG. 6 is a simplified logic diagram of quiesce logic to generate a producer barrier token and quiesce ready logic.

FIG. 6 illustrates quiesce logic which can be part of or associated with, in a logical signaling sense, one of the configurable units (or more generally processing units) in the array. The quiesce logic is coupled with, in one example, the barrier logic, control command daisy chain and the completion/quiesce daisy chain circuits shown in FIG. 4. The quiesce logic shown in FIG. 6 includes a skew counter. The skew counter can be a dedicated counter that is used to track the loop iteration skew or quiesce boundary skew between producers and consumers. In loops with deep pipelines, or when producers and consumers are physically spaced apart, the producers might execute or run ahead of the consumers, creating a skew.

In an EFRG including a plurality of configurable units, a QB can be defined by a combination of events, such as configurable states, distributed among some of the configurable units in the EFRG. In a given implementation, some of the configurable units of an EFRG can be configured as producers and some can be configured as consumers. A QB for the execution fragment can comprise an event that is a function of different events at producers in the EFRG. The consumers in the EFRG can operate asynchronously, and respond to, or use, signals and data provided by the producers. Events at the consumers can signal consumption of the signals or data from the producers.

Figure 7:
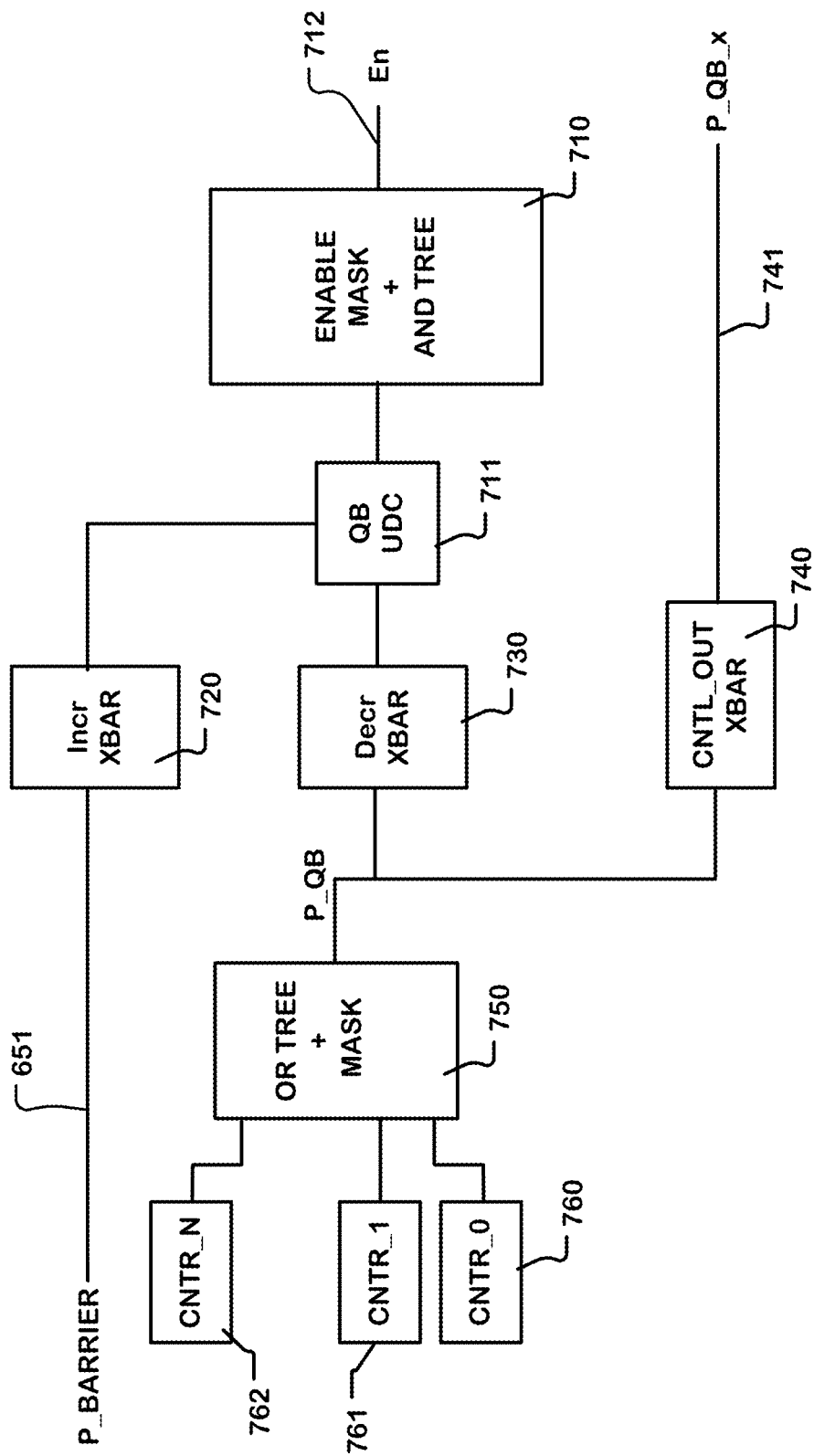
FIG. 7 is a simplified logic diagram of quiesce boundary logic.
Figure 8:
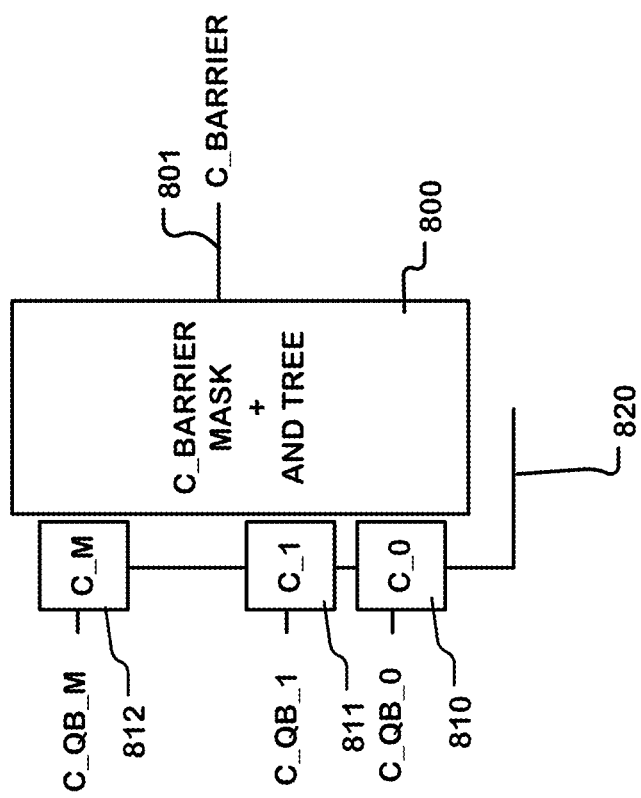
FIG. 8 is a simplified logic diagram of quiesce logic to generate a consumer barrier token.

In FIG. 6, signals indicating events at the producers for a QB are denoted P_QB_x, where x is a designator of the source of the event signal, and goes from 0 to N in the illustrated example. The P_QB_x signals can be generated as illustrated in FIG. 7. A configurable combination of P_QB_x signals is used to generate the signal EF_QB which indicates detection of a QB in the EFRG and, in combination with quiesce control signals, to generate the signal P_BARRIER, in this example. Thus, the quiesce logic is responsive to the loop counter in at least one processing unit in the EFRG to detect the quiesce boundary. A signal C_BARRIER is produced in quiesce/barrier logic associated with consumers in the EFRG, as illustrated by FIG. 8 below, based on a combination of events at the consumers for the QB, denoted C_QB_x, where x is a designator of the source of the event signal, and goes from 0 to M in the illustrated example. M and N can be the same or different depending on a particular configuration of the EFRG.

The P_BARRIER signal is used in this implementation to enable the producers in the EFRG to continue beyond a QB. If it is not asserted, then the producers are not enabled to proceed beyond the QB. The consumers may not complete for a given QB before the producers begin the next QB, giving rise to the possibility of skew within the EFRG.

In basic operation, the skew counter in FIG. 6 is incremented by the P_BARRIER signal, and decremented by the C_BARRIER signal. Thus, it tracks the number of quiesce boundaries (as represented by P_BARRIER) between producers and consumers of the EFRG. The skew counter can also serve as a mechanism to detect in-flight data packets or transactions from producers to consumers.

In the illustrated logic, a command AGCU_CMD from the master AGCU in the arrays is delivered across the command daisy chain to a decoder 601. The master AGCU can distribute this command using the daisy chain in response to an external event originating outside the array, as indicated by a signal received from a host control program on an external processor during runtime. Also, the master AGCU can distribute this command using the daisy chain in response to an internal event originating inside the array, such as can be indicated by a signal generated by the machine implemented by the current configuration of the array and delivered to the master AGCU on a control bus or otherwise. For a quiesce command, a flip-flop 602 is set to store a flag Q_RCV to start a quiesce operation. This flag can be reset many ways, including for example generating a reset signal in response to any subsequently received command that is not a quiesce command, from the master AGCU, or by using a token in the control barrier logic. The output of the flip-flop 602 is connected to gate 603 which enables the quiesce ready daisy chain logic that comprises the multiplexer 604 and the configuration store 605. The configuration store 605 stores a quiesce participate Q_PCPT flag. The quiesce participate flag is set for the configurable units associated with the quiesce logic that are required to participate in the quiesce operation. For example, in a quiesce operation, only configurable units which act as producers may be required to participate. The use of the quiesce participate flag enables efficient utilization of the configuration resources for the purposes of quiesce.

A second input to the gate 603 is provided from the logic circuit that tracks progress of the execution fragment across quiesce boundaries, which is allocated to the corresponding set of configurable units. In this example, the second input is provided when the output of a skew counter, SKEW UDC 632, is equal to zero, as indicated by element 633.

The flip-flop 602 is also provided as an inverted input to gate 630, enabling the logic to track progress of execution of the execution fragment. A second input to gate 630 is the output EF_QB of a barrier mask and AND tree 610, which can be implemented using elements 520 and 521 shown in FIG. 5. The barrier mask and AND tree 610 can be configured to generate the EF_QB signal. In the simplified illustration in FIG. 6, the inputs to the barrier mask and AND tree 610 comprise elements of the token store that are configured to receive signals P_QB 0 to P_QB N in UDCs 620-622, which signal execution fragment quiesce boundaries for an associated set of producer configurable units. In addition, the token store can include a start token in UDC 611 delivered to the configurable units in the array by a master state machine for example in the master AGCU, and other tokens and control signals. The barrier mask and AND tree 610 can be configured to generate EF_QB as an input to the gate 630 in response to the configuration quiesce logic for producers required for the particular execution fragment.

The output of the gate 630 is provided as an input to gate 631, the output of which is applied to the increment input of SKEW UDC 632. The decrement input of SKEW UDC 632 is provided by the control input crossbar 640, which is configured for the purposes of quiesce to receive a consumer barrier token C_BARRIER on line 641 of the control barrier network.

When the SKEW UDC 632 is full, a signal is asserted that disables the gate 631. The size of the SKEW UDC 632, which can be fixed or configurable in various embodiments, sets a maximum skew in units of quiesce boundaries of an execution fragment. Skew among units can be controlled on skew units other than quiesce boundaries in some configurations, using this type of logic.

The output of the gate 631 is also provided as feedback to the token store UDCs 620-622 and 611, to clear or decrement the values stored. Also, the output of gate 631 is provided to the control output crossbar 650 which can be configured to output the signal as the P_BARRIER on line 651 of the control barrier network, for the execution fragment allocated to the associated set of configurable units.

In operation, when the configurable units that act as producers reach a quiesce boundary in the execution fragment, an P_QB_x signal is applied to the token store. When all of the producers have applied the P_QB_x then, as long as the output of the flip-flop 602 is low, a producer barrier signal P_BARRIER is applied on line 651, and the SKEW UDC 632 is incremented, so long as it is not full. When a C_BARRIER is received on line 641, the SKEW UDC 632 is decremented. Thus, the SKEW UDC 632 can be used to track progress of the execution fragment across quiesce boundaries among a set of configurable units acting asynchronously.

As long as the SKEW UDC 632 is not full, and the output of flip-flop 602 is low, the output of gate 631 is equal to the EF_QB signal, and a P_BARRIER signal is generated. This signal enables the producers to proceed beyond the QB signaled by the EF_QB signal to the root of the next segment. If the output of flip-flop 602 is high, the output of gate 631 is set to logic zero, and the P_BARRIER is not asserted. This prevents the producers from proceeding beyond the QB signaled by the EF_QB, allowing quiesce to occur.

When the output of the flip-flop 602 is high, the logic stops asserting the P_BARRIER on line 651, and stops incrementing the SKEW UDC 632. As soon as the SKEW UDC is decremented to zero (633) while the gate 603 is enabled by the output of flip-flop 602, and the Q_PCPT bit is set, a quiesce ready Q_RDY signal flips from logical 0 to logical 1 on line 652. The Q_RDY signal for the execution fragment can be delivered to the array quiesce controller on the completion/quiesce daisy chain, in this embodiment, based on the logical combination of the quiesce ready Q_RDY signal from the previous unit in the array in the daisy chain. If the Q_PCPT bit is not set, then the Q_RDY signal remains at logical 1, to keep the daisy chain connected across participating and non-participating configurable units.

FIG. 7 illustrates logic associated with the configurable unit configured as a producer that consumes the P_BARRIER token from line 651, generates the producer quiesce boundary signal P_QB_x on line 741 for the portion of the execution fragment executed on the associated configurable unit. The P_QB_x signals are generated upon detection of the sets of configuration states for the configurable units used as producers in each execution fragment resource group represented by the configuration of the OR tree and Mask 750, and counters 760-762 in FIG. 7. The logic produces an enable signal on line 712 to proceed beyond a quiesce boundary of the execution fragment to the root of the next segment of the EF, or to wrap to the beginning root of the EF if it is the last QB in the EF. Thus, the root of a segment of the EF after a QB becomes a quiesce point for the EF.

The P_BARRIER is a synchronization barrier between producer components of EFRG for an execution fragment in this example. Every loop of an EF at a particular producer can include at least one P_QB_x. The producer signals P_QB_x are connected together to form a control flow barrier as shown in FIG. 6. Client components that participate in generation of P_BARRIERS using P_QB_x signals are configured to participate in the quiesce process at compile time.

In the embodiment illustrated, the configurable unit includes, or can be configured to connect to, a counter chain comprising counters CNTR_0 to CNTR_N (760-762) which can indicate a state of the component. The counters in the counter chain can be located anywhere on the device, from which the outputs can be delivered to the logic of FIG. 7. In some embodiments, the counter chain is implemented as part of the configurable unit. The counter chain outputs are applied to an OR tree and mask 750 which can be set by the configuration file to generate the execution fragment quiesce boundary signal P_QB on any combination of the status of counters in the counter chain. The OR tree and mask 750 is configurable to select the combinations of counters and counter states to be ORed together, or otherwise combined logically, to signal a state corresponding to a quiesce boundary. The quiesce boundary signal P_QB can be set at completion of a loop, for example, or at divisible portions of a loop. For example a loop having a large number N iterations may be divided into N/M quiesce boundaries of up to M iterations each. The technology does not require that M is a divisor of N. A final quiesce boundary may have a remainder number of iterations less than M. This division and the handling of the remainder loop iterations can be implemented using the configurable OR tree or other types of logic.

The boundary signal P_QB is applied as an input to a decrement crossbar 730 which is coupled to the QB UDC token store 711. The increment input of the QB UDC token store 711 is applied by the increment crossbar 720, which receives the P_BARRIER for the EFRG of which the configurable unit is a member. The QB UDC token store 711 can be one of many token stores fed by control signals and barrier signals in the control barrier network to an enable mask and AND tree 710, which can be implemented using the elements 500 and 503 of FIG. 5. The output of the enable mask and AND tree 710 is an enable signal for the associated configurable unit to enable execution to resume at the root of the segment before the next quiesce boundary. All the producers in the EFRG can be enabled by the same P_BARRIER signal, to manage synchronization of the EFRG across member configurable units.

The boundary signal P_QB is applied also as an input to the control output crossbar 740 to provide the P_QB_x signal as one of the P_QB_x signals to the logic described in FIG. 6.

FIG. 8 illustrates implementation of the barrier logic to produce the C_BARRIER token in quiesce logic associated with configurable units acting as consumers in the EFRG.

The C-BARRIER token is a synchronization barrier between consumer components in an execution fragment. Each configurable unit acting as a consumer can be configured so that each segment, such as loop or partition of a loop, of an EF performed in the unit, can contain a single C_QB_x on a quiesce boundary, which corresponds to an exit point for the segment. The C_QB_x signals can be generated upon detection of the sets of configuration states for the configurable units used as consumers in each execution fragment resource group, in the manner described with reference to the P_QB_x signals shown in FIG. 7, or in equivalent ways adapted to the consumer functions.

In this example, a set of token stores 810-812 receive the C_QB_x quiesce boundary signals from the quiesce logic associated with configurable units acting as consumers in the execution fragment.

A mask and AND tree 800 (which can be implemented using elements 520 and 521 of FIG. 5) is configured to generate the C_BARRIER token for the EFRG on line 801 on detection of the configured combination of C_QB_x signals. The C_BARRIER token on line 801 is provided to the portion of the quiesce logic shown in FIG. 6.

The token stores 810-812 are decremented or reset, in response to a signal on line 820, such as the C_BARRIER signal from line 801, or other configurable signal.

The circuits shown in FIGS. 6-8 are logic units of the quiesce logic coupled to a control bus configurable to form signal routes in the control barrier network among the logic units. The control barrier network comprises a plurality of barrier logic units having inputs and outputs connected to the control bus and to the array of processing units. The barrier logic units include a first logic unit (e.g. FIGS. 6-7) coupled to the EFRG, configurable to consume signals from producers of inputs signaling quiesce boundaries in the EFRG and to generate a producer barrier token based on the signals from producers; a second logic unit (e.g. FIG. 8) coupled to the EFRG, configurable to consume signals from consumers of inputs signaling use of the inputs to the EFRG for the quiesce boundaries, and to generate a consumer barrier token based on the signals from consumers. The quiesce logic includes circuitry configurable to connect to the control bus, and including a skew counter configurable to receive the producer barrier token and the consumer barrier token to track differences in progress of the execution fragment among the producers and the consumers.

FIG. 9 is a simplified block diagram of components of a CGRA (Coarse Grain Reconfigurable Architecture) processor in which the CGRA processor has 2 tiles (Tile1, Tile2). The tile comprises an array of configurable units connected to a bus system, including an array level network in this example like that shown in FIGS. 2 and 3. The bus system also includes a top level network connecting the tiles to external I/O interface 905 (or any number of interfaces). In other embodiments, different bus system configurations may be utilized. The configurable units in each tile are nodes on the array level network in this embodiment.

Each of the two tiles has 4 AGCUs (Address Generation and Coalescing Units) (e.g. MAGCU1, AGCU12, AGCU13, AGCU14). The AGCUs are nodes on the top level network and nodes on the array level networks, and include resources for routing data among nodes on the top level network and nodes on the array level network in each tile.

Nodes on the top level network in this example include one or more external I/O interfaces, including interface 905. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU, which includes an array quiesce controller 351 and configuration load/unload controller for the tile. In other embodiments, more than one array quiesce controller 351 can be implemented per tile, and one array quiesce controller 351 may be implemented by logic distributed among more than one AGCU.

The MAGCU1 includes an array quiesce controller 351 for Tile1, and MAGCU2 includes an array quiesce controller 351 for Tile2. In other embodiments, an array quiesce controller 351 can be designed for quiesce control of more than one tile. In other embodiments, more than one array quiesce controller can be designed for configuration of a single tile. Also, the array quiesce controller 351 can be implemented in other portions of the system, including as a stand-alone node on the top level network and the array level network or networks.

The top level network is constructed using top level switches (911-916) connecting to each other as well as to other nodes on the top level network, including the AGCUs, and I/O interface 905. The top level network includes links (e.g. L11, L12, L21, L22) connecting the top level switches. Data travel in packets between the top level switches on the links, and from the switches to the nodes on the network connected to the switches. For example, top level switches 911 and 912 are connected by a link L11, top level switches 914 and 915 are connected by a link L12, top level switches 911 and 914 are connected by a link L13, and top level switches 912 and 913 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 911, 912, 914 and 915 are connected to MAGCU1, AGCU12, AGCU13 and AGCU14 in the tile, Tile1, respectively. Top level switches 912, 913, 915 and 916 are connected to MAGCU2, AGCU22, AGCU23 and AGCU24 in the tile, Tile2, respectively.

Top level switches can be connected to one or more external I/O interfaces (e.g. interface 905). A host executing a runtime program can communicate with the array quiesce controllers and with the configuration load/unload controllers via the top level network.

Figure 10:
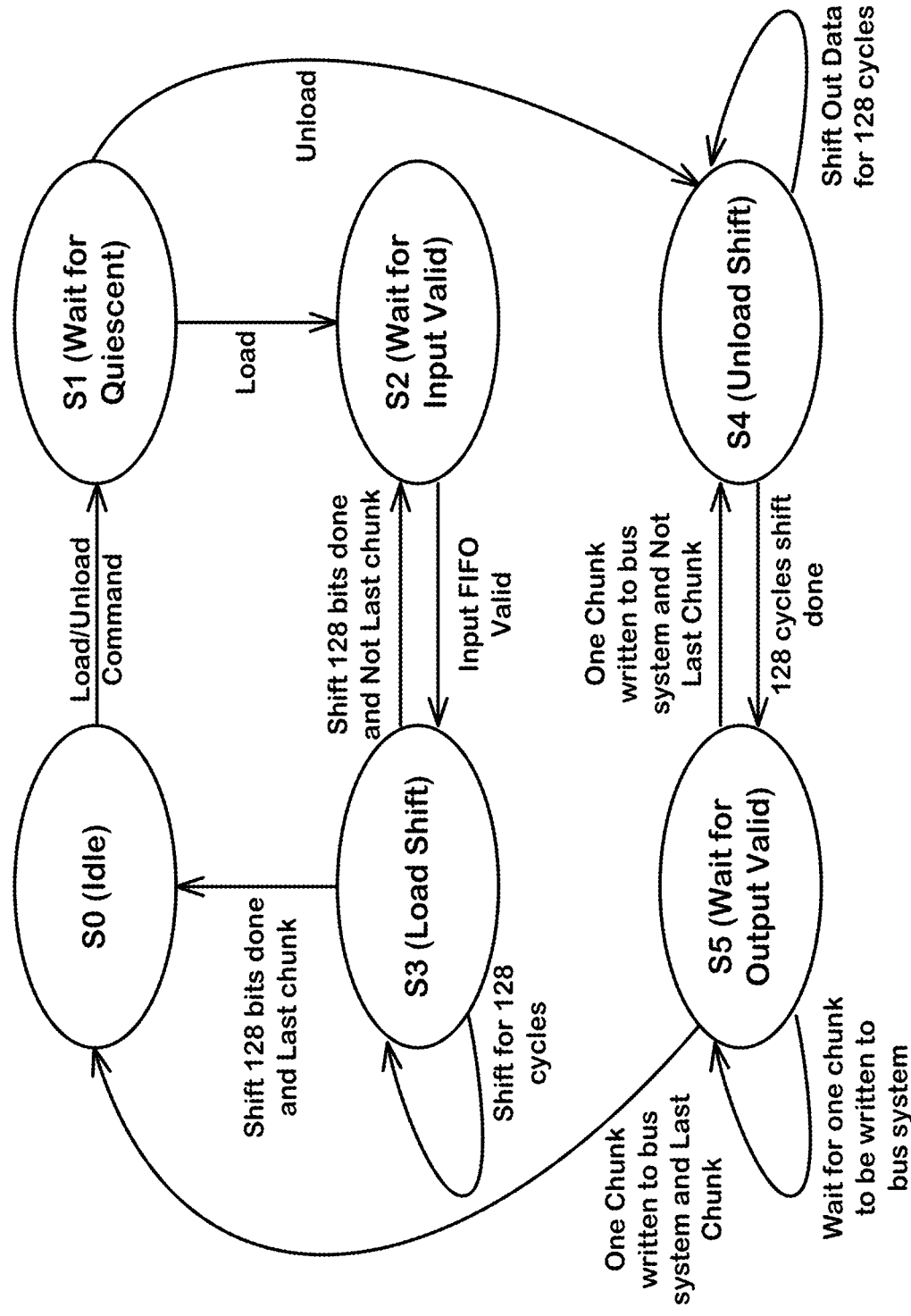
FIG. 10 illustrates one example of a state machine diagram that can be used to control a unit configuration load process in a configurable unit.

FIG. 10 illustrates one example of a state machine that can be used to control a unit configuration load process in a configurable unit. The configuration load process can be controlled by configuration load logic in a master AGCU for example, and can be coupled with the array quiesce controller. In general, a unit configuration load process receives a first chunk (or sub-file) of the unit file particular to the configurable unit from the bus system in one bus cycle, then begins pushing the received first chunk into the serial chain during subsequent shifter cycles which occur at the same rate as the bus cycles, before a second chunk of the unit file is received. Upon receiving the second chunk of the unit file particular to the configurable unit from the bus system in a later bus cycle, the process begins pushing the received second chunk into the serial chain during cycles after pushing earlier received chunks into the serial chain. In some or all rounds of the configuration load process, a first chunk can be consumed by the unit configuration load process in the configurable unit before the second chunk (next in the order of chunks of the unit file) in the plurality of ordered chunks is received by the configurable unit.

The state machine of FIG. 10 includes six states S0 to S5. At State S0 (idle), the unit configuration load process waits for a configuration load/unload command from a configuration load/unload controller in a master AGCU. A configuration load/unload controller is responsible for loading and unloading of configuration data from/to the off-chip memory (140, FIG. 1) and to/from an array (190, FIG. 1) of configurable units. When a load command is received at the configuration load/unload controller, the unit configuration load process enters State S1.

At State S1 (wait for quiescent), the state machine waits for the quiescent state after a load or unload command. In state S1, the state machine can execute a quiesce process as described herein including distributing a quiesce command. When the quiescent state is established, functional flops in multiple datapaths are disabled so the functional flops are not cycling, and scalar outputs, vector outputs and control outputs are turned off so the outputs are not driving any loads. The quiescent state of the array can be induced using the array quiesce controller and quiesce logic described above. If a load command has been received, then after the quiescent state is reached, the unit configuration load process enters State S2. When an unload command is received, then after the quiescent state is reached, the unit configuration load process enters State S4.

At State S2 (wait for input valid), the unit configuration load process waits for an input FIFO (1110, FIG. 11) to become valid. When the input FIFO becomes valid, the input FIFO has received a chunk of configuration data of the configuration file via the bus system. For instance, a chunk of configuration data can include 128 bits of load data, which is received on the vector network of the bus system and the vector network has the vector bus width of 128 bits. When the input FIFO becomes valid, the unit configuration load process enters State S3.

At State S3 (load shift), a chunk of configuration data of 128 bits is first de-queued in one clock cycle from the input FIFO, and then the chunk of configuration data of 128 bits is shifted into an input shift register (1120, FIG. 11) in 128 clock cycles. The input shift register can have the same length (e.g. 128 bits) as a chunk of configuration data, and it takes the same number of shifter clock cycles (e.g. 128) to shift the chunk of configuration data into the input shift register as the length of the chunk of configuration data. As mentioned above, the shifter clock and the bus clock (or bus cycles) can run at the same rate in some embodiments.

Figure 11:
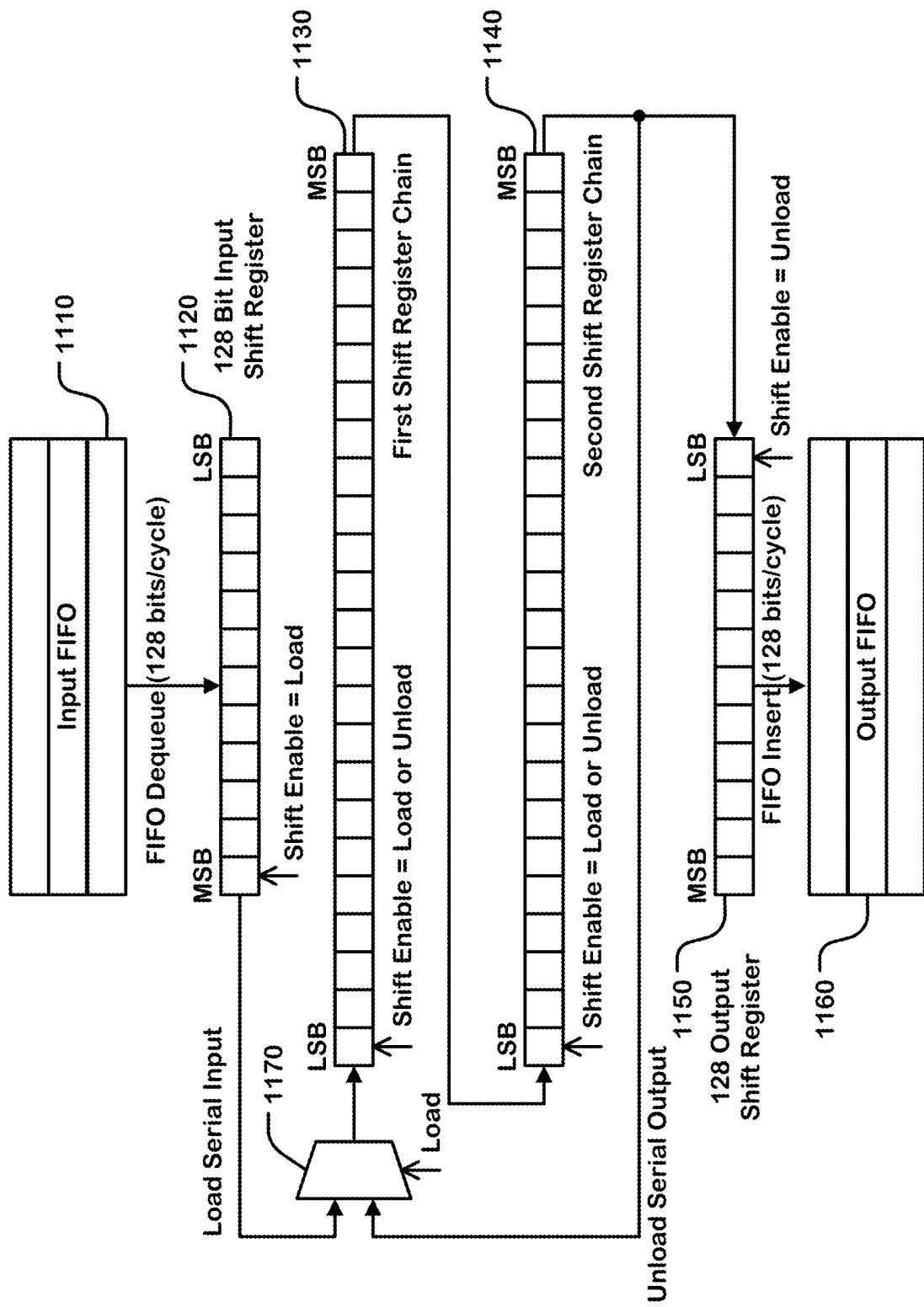
FIG. 11 is a logical representation of a structure supporting load and unload of a configuration file in a configurable unit.

FIG. 11 is a logical representation of a configuration store in a configurable unit. A configuration data store (420, FIG. 4) in a configurable unit comprises a configuration serial chain in this embodiment, including a first shift register chain 1130 and a second shift register chain 1140. The first shift register chain 1130 includes a set of registers or latches. The second shift register chain 1140 includes another set of registers or latches (flip-flops). The first shift register chain and the second shift register chain are connected in series to form a single chain in this embodiment.

A configuration file includes a plurality of chunks of configuration data for each configurable unit in a plurality of configurable units in an array of configurable units. The chunks of configuration data represent the initial configuration, or starting state, of respective configurable units. A configuration load operation in this system is the process of setting up the unit files of configuration data in an array of configurable units to allow all the configurable units to execute a program.

The set of registers in the first shift register chain 1130 can represent either the setup or the sequence to run a program, including a definition of the operation of the configurable units containing the registers. These registers can register the number of nested loops, the limits of each loop iterator, quiesce boundaries, the instructions to be executed for each stage, the source of the operands, and the network parameters for the input and output interfaces. The set of registers in the second shift register chain can contain data about the running state of a program loaded in a configurable unit on quiesce boundaries of the execution fragments allocated to the array.

As shown in the example of FIG. 11, the first shift register chain 1130 and the second shift register chain 1140 are connected in series, so that the MSB (most significant bit) of the first shift register chain is connected to the LSB (least significant bit) of the second shift register chain. A load signal or an unload signal can act as a shift enable signal coupled to the LSB of the first shift register chain and the LSB of the second shift register chain, to control a load/unload operation on the first shift register chain and the second shift register chain. Input FIFO 1110 is coupled to the input shift register 1120 via a selector 1170. The selector 1170 connects the input shift register 1120 to the input of the configuration data store (LSB of the first shift register chain 1130), when the load signal is active.

When a load signal is active, configuration data in the input shift register 1120 can be shifted into the first shift register chain 1130 and the second shift register chain 1140 in the configuration serial chain. Here the load signal can act as an enable signal for the input shift register, the first shift register chain, and the second shift register chain. The load operation can repeat until all chunks of configuration data for a configurable unit are loaded into the configuration data store in the configurable unit. When the length of the serial chain is different than the length of an integer number of chunks (or sub-files), the first chunk in the series can be padded with the difference, and the pad bits will be shifted out to the end of the chain when the last chunk is shifted in. For example, a configuration data store in a configurable unit can store a unit file having a size of 1400 bits. The unit configuration load process can load an integer number N of chunks. In this example, N=11, and the number N of chunks include Chunk 5, Chunk 4, Chunk 3, Chunk 2, Chunk 1 and Chunk 0. A vector bus has a vector width of 128 bits, a chunk of configuration data has 128 bits, and a chunk can be sent to a configurable unit in one bus clock cycle. The N chunks have a size of N×128=11*128=1408 bits, which includes 8 pad bits to match the unit file size of 1408 bits.

In order to recover from errors, an unload operation can checkpoint the state of each configurable unit. The unload operation can save the execution state of each configurable unit on a quiesce boundary that is needed for restart, and enable the application to be restarted if an error occurs. It also allows the state of configurable units to be saved or transferred for debug purposes. The state that needs to be saved includes at least the contents of part the first or second shift registers, and optionally contents of the PMU memories. Program unload may also require unloading the state of all of the first and second shift registers.

Output FIFO 1160 is coupled to the output shift register 1150, which in turn is coupled to the output of the configuration data store (MSB of the second shift register chain 1140). For an unload operation, when an unload signal is active, the configuration data in the second shift register chain 1140 and the first shift register chain 1130 can be shifted into the output shift register 1150. When the output FIFO 1160 is valid, the configuration data (e.g. 128 bits) in the output shift register 1150 can be inserted into the output FIFO 1160 in one clock cycle. The unload operation can repeat until all chunks of configuration data in a configuration data store in a configurable unit are unloaded into the output FIFO. Program unload with quiesce can also be used to implement a multiprogramming environment and to implement a multitasking environment wherein a high priority program may interrupt a low priority program on a quiesce boundary of the low priority program, the low priority program is quiesced and unloaded, and the high priority program is then loaded and executed.

In order to synchronize and communicate the completion of configuration load commands issued by the configuration load controller in a MAGCU, a single wire daisy-chained scheme is implemented in one example, supported by logic included in daisy chain logic (e.g., daisy chain logic 493 in FIG. 4) in each component of the chain. This scheme requires every component to have the following 2 ports:

1. Input port called PROGRAM_LOAD_DONE_IN
2. Output port called PROGRAM_LOAD_DONE_OUT A component will drive its PROGRAM_LOAD_DONE_OUT signal when it has completed executing the command issued by MAGCU and its PROGRAM_LOAD_DONE_IN input is driven high. MAGCU will initiate the daisy chain by driving its PROGRAM_LOAD_DONE_OUT when it has completed all necessary steps for executing a command. The last component in the chain will drive its PROGRAM_LOAD_DONE_OUT which will be connected to PROGRAM_LOAD_DONE_IN of MAGCU. PROGRAM_LOAD_DONE_IN of MAGCU going high indicates the completion of a command. After delivering the data corresponding to all CHUNKS of all components, MAGCU drives its PROGRAM_LOAD_DONE_OUT port high. All components will drive their respective PROGRAM_LOAD_DONE_OUT ports high when they have completed loading all their configuration bits. This operation can execute on the same daisy chain as the quiesce ready signaling.

When MAGCUs input port PROGRAM_LOAD_DONE_IN is asserted, the configuration file load is complete. The same or similar logic can be used for the Q_RDY signal as discussed above.

Figure 12:
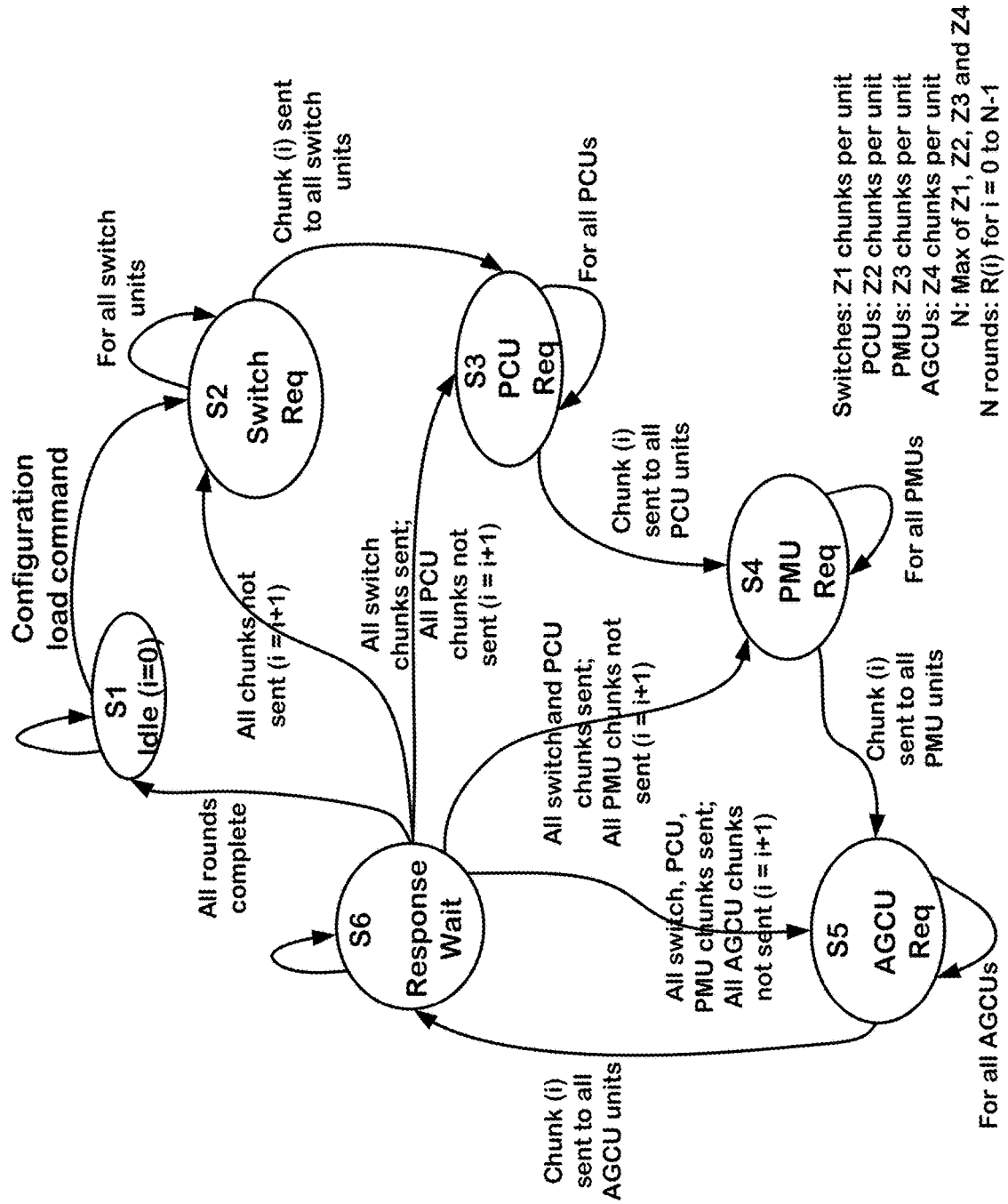
FIG. 12 is a state machine diagram illustrating one example of logic to execute an array configuration load process.

FIG. 12 is a state machine diagram illustrating one example of logic to execute an array configuration load process for a system like that of FIGS. 3 and 10, including distributing a configuration file comprising unit files for a plurality of the configurable units in the array, the unit files each comprising a plurality of ordered chunks (or sub-files), by sending in a sequence of N rounds (R(i) for i=0 to N−1) one unit chunk of order (i) via the bus system to all of the configurable units including up to N sub-files in the plurality of configurable units, until the unit files in the configuration file are distributed to the configurable units in the plurality of configurable units.

In this example, the state machine includes six states S1 to S6. At State S1 (Idle), the configuration load controller waits for a configuration load command from the host. When a configuration load command is received, the load process enters State S2 to begin executing a first round R(0) of the distribution sequence. Each round traverses states S2 to S6. In the example described herein, there are six rounds because the maximum number of chunks to be distributed to a configurable unit in the array is six.

At State S2 (Switch Req), the configuration load controller generates memory access requests via the top level network to retrieve chunks for state S2 of round R(i) of the configuration unit files for respective switch units, and distributes the retrieved chunks to the respective switch units. For i=0, in round R(0), the configuration load controller generates memory access requests for the chunk (0) in the multiple chunks for respective switch units, and sends the chunks (0) to the respective switch units. For i=1, in round R(1), the configuration load controller generates memory access requests for chunk (1) in the multiple chunks for respective switch units, and sends the chunks to the respective switch units. In round R(i), when the configuration load controller has generated memory access requests for the chunks (i) in the multiple chunks for the respective switch units, and distributed the chunks for all the switch units, the load process enters State S3.

At State S3 (PCU Req), the configuration load controller generates memory access requests via the top level network to retrieve chunks for round R(i) of the configuration unit files for respective PCU units (Pattern Compute Units), and distributes the retrieved chunks to the respective PCU units. In state S3 of round R(i), the configuration load controller generates memory access requests for the chunks (i) in the multiple chunks for respective PCU units, and sends the chunks (i) to the respective PCU units. In round R(i), when the configuration load controller has generated memory access requests for chunk (i) in the multiple chunks for the respective PCU units and distributed the chunks, the load process enters State S4.

At State S4 (PMU Req), the configuration load controller generates memory access requests via the top level network to retrieve chunks of the configuration unit files and memory files in some embodiments, for respective PMU units (Pattern Memory Units) in the array of configurable units, and sends the retrieved chunks to the respective PMU units. In state S4 of round R(i), the configuration load controller generates memory access requests for the chunks (i) in the multiple chunks for respective PMU units, and sends the chunks (i) to the respective PMU units. For instance, for i=0, in round R(0), the configuration load controller generates memory access requests for the chunks (0) in the multiple chunks for respective PMU units, and sends the chunks (0) to the respective PMU units. For i=1, in round R(1), the configuration load controller generates memory access requests for the chunks (1) in the multiple chunks for respective PMU units, and sends the chunks (1) to the respective PMU units. In round R(i), when the configuration load controller has generated memory access requests for the chunks (i) in the multiple chunks for the respective PMU units and distributed the chunks, the load process enters State S5.

At State S5 (AGCU Req), the configuration load controller generates memory access requests via the top level network to retrieve chunks of the configuration unit files for respective AGCUs (Address Generation and Coalescing Units) in the array of configurable units, and sends the retrieved chunks to the respective AGCU units. In State S5 of round R(i), the configuration load controller generates memory access requests for the chunks (i) in the multiple chunks for respective AGCU units, and sends the chunks (i) to the respective AGCU units. In state S5 of round R(i), when the configuration load controller has generated memory access requests for the chunks (i) in the multiple chunks for the respective AGCU units and distributed the chunks, the load process enters State S6 of round R(i).

At State S6 (Response Wait), the configuration load controller waits to ensure that configurable units (switch, PCU, PMU, AGCU units) in the array are ready to receive more chunks of configuration data in a next round. If all chunks for the switch units are not sent, the load process increments (i) and proceeds to State S2 to start the next round R(i+1). If all chunks for the switch units are sent but all chunks for the PCU chunks are not sent, the load process increments (i) and proceeds to State S3 to start the next round R(i+1). If all chunks for the switch units and the PCU units are sent but all chunks for the PMU chunks are not sent, the load process increments (i) and proceeds to State S4 to start the next round R(i+1). If all chunks for the switch units, the PCU units, and the PMU units are sent but all chunks for the AGCU chunks are not sent, the load process increments (i) and proceeds to State S5 to start the next round R(i+1). If all chunks for all configurable units (switch, PCU, PMU, AGCU units) are sent (i.e., all rounds complete), the load process proceeds to State S1.

Figure 13:
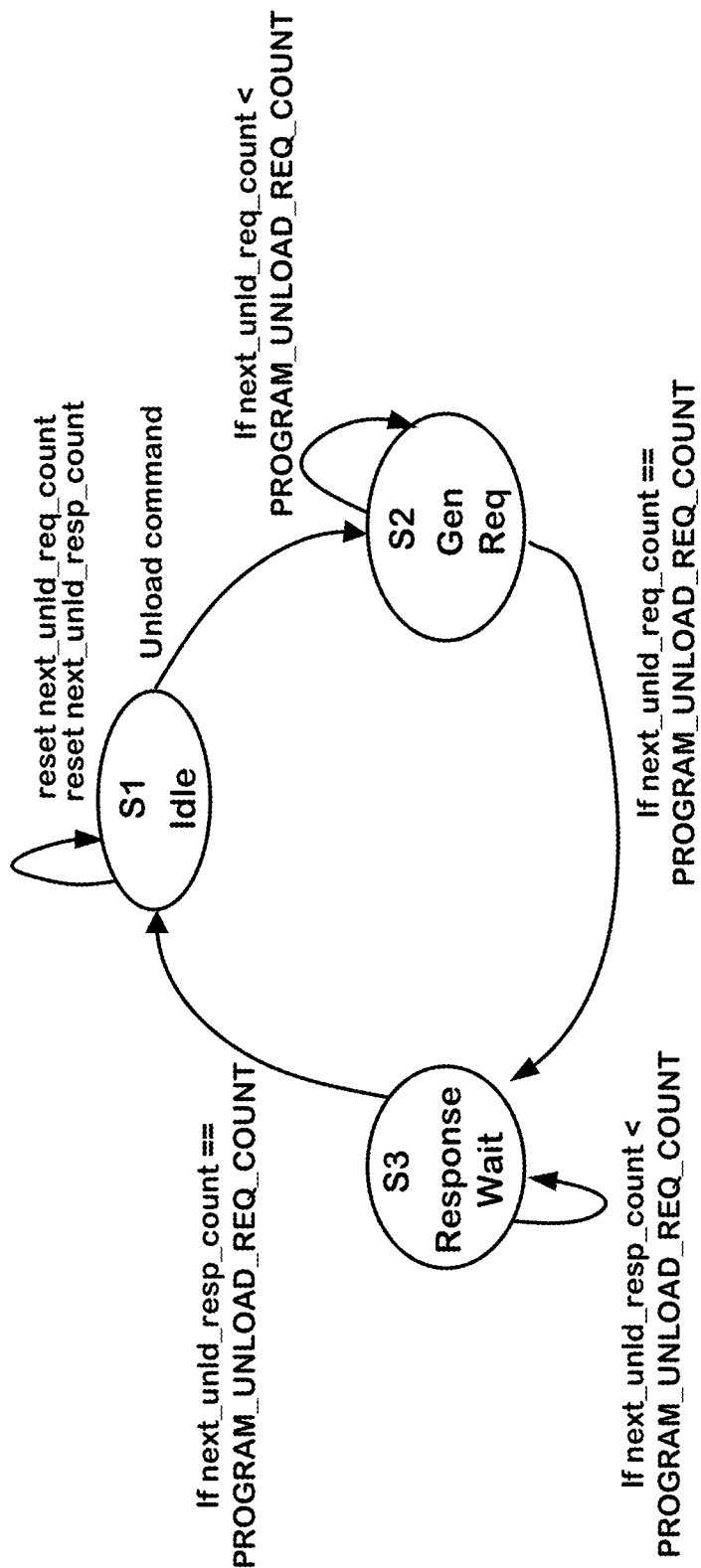
FIG. 13 is a state machine diagram illustrating one example of logic to execute an array configuration unload process.

FIG. 13 is a state machine diagram for one example of logic to execute an array configuration unload process.

In this example, the state machine includes three states S1 to S3. At State S1 (Idle), the configuration unload controller waits for a configuration unload command from the host. The configuration unload controller implements two counts "next_unld_req_count" and "next_unld_resp_count" for the array configuration unload process. The count "next_unld_req_count" keeps track of the next unload request count. The count "next_unld_resp_count" keeps track of the next unload response count. At State S1, both counts are reset to an initial value, such as 0. When a configuration unload command is received, the unload process enters State S2.

At State S2 (Gen Req), the configuration unload controller generates unload requests for each of the configurable units in the array of configurable units, including the switch units, the PCUs, the PMUs and the AGCUs in the array. The count "next_unld_req_count" is incremented for each unload requests generated. The count "next_unld_req_count" is compared against a predetermined number PROGRAM_UNLOAD_REQ_COUNT, which represents the total number of the configurable units in the array of configurable units. As long as the count "next_unld_req_count" is less than PROGRAM_UNLOAD_REQ_COUNT, the unload process stays in State S2. When the count "next_unld_req_count" is equal to PROGRAM_UNLOAD_REQ_COUNT, the unload requests have been generated for each of the configurable units in the array, and the unload process enters State S3.

At State S3 (Response Wait), the configuration unload controller increments the count "next_unld_resp_count" for each response received from the configurable units in the array. A response includes a chunk (sub-file) in a unit file of configuration data for a configurable unit. A response can also include PMU scratchpad data in some examples. During the unload process, a response is provided to a vector output of a configurable unit and sent on a vector bus to the configuration load controller. As long as the count "next_unld_resp_count" is less than PROGRAM_UNLOAD_REQ_COUNT, the unload process stays in State S3.

At State S3, the unload process generates a memory address for each response received, and inserts each response received along with the memory address generated on the top level network. Each response includes an unload chunk and a sequence ID. A memory address is generated from headers that accompany packets carrying the chunks in the array level network, including a chunk number, a column identifier, a row identifier, and a component identifier in a sequence ID. A component identifier can indicate whether a configurable unit is a switch unit, a PCU unit, a PMU unit or an AGCU unit. A sequence ID is further described in reference to FIG. 3.

When the count "next_unld_resp_count" is equal to PROGRAM_UNLOAD_REQ_COUNT, the responses have been received from each of the configurable units in the array and inserted on the top level network, and the unload process transitions back to State S1.

In one embodiment, the order for the linear memory addresses for configuration data in switch units is the first chunks of each row in the first column of switch units, followed by the first chunks of each row in the second column of switch units, followed by the first chunks of each row in the third column of switch units, and so on until the first chunks of each row in the last column. This groups the first chunk of all switch units in linear address space. The first chunks for other types of configurable units are loaded in groups in adjacent address space. Then, the order is followed by the second chunks of each row in the first column of switch units, followed by the second chunks of each row in the second column of switch units, followed by the second chunks of each row in the third column, and so on until the last chunk in the last row in the last column of switch units, and so on, for the second chunks of all the types of configurable units.

In some embodiments, the unload process can be used at quiesce boundaries to unload or copy the configuration, state, and memory data from the EFRGs, to unload or copy state information and memory contents only, or to unload or copy state information only, without configuration data usable for the purposes of debugging, for example.

Figure 14:
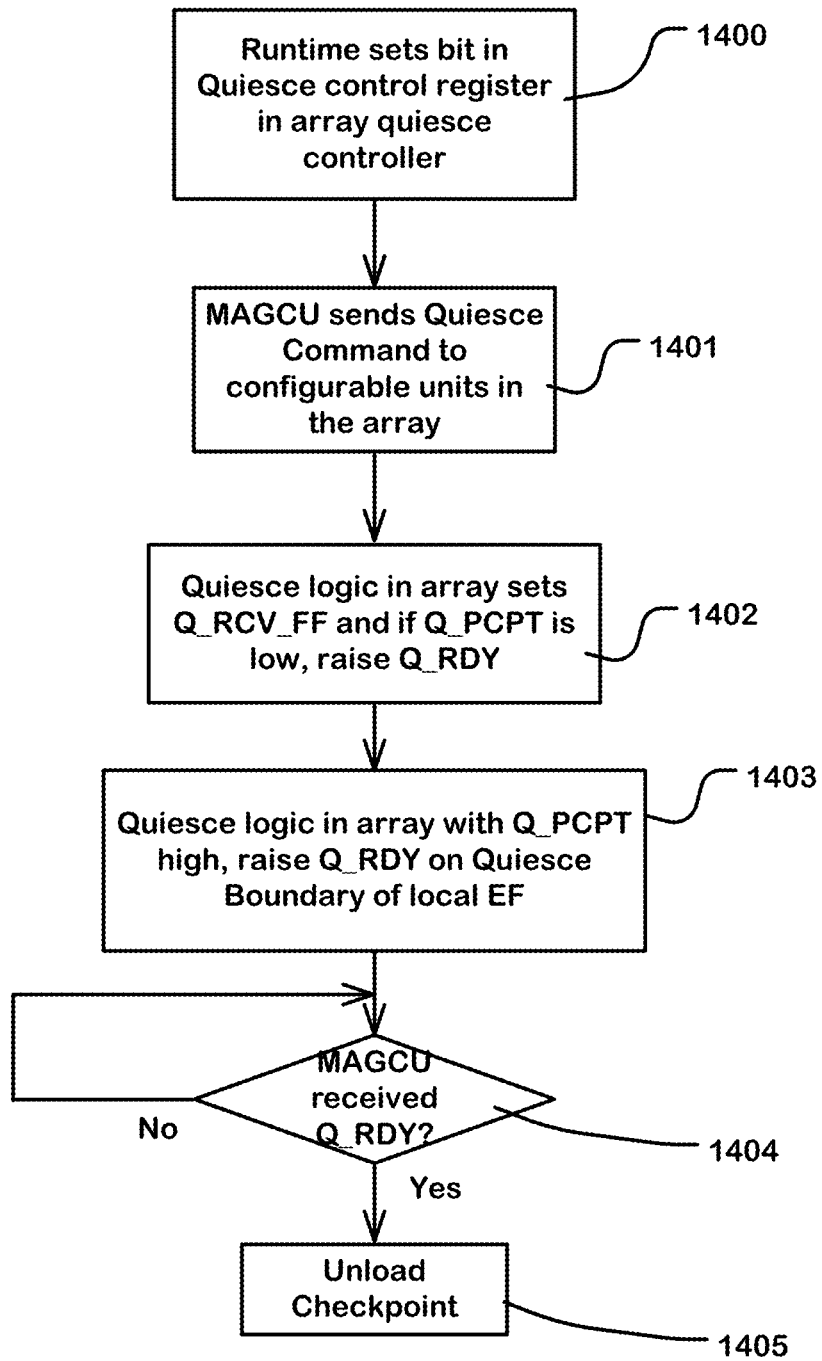
FIG. 14 is a flow chart of one example of a quiesce operation followed by an array configuration and program unload process for an array of configurable processing units.

FIG. 14 is a simplified flowchart showing execution of a quiesce operation by the array quiesce controller at a master AGCU. In this example, the quiesce operation is started in response to an external request from, for example, a runtime program in the host which sets a bit in a quiesce control register in the array quiesce controller (1400). In some embodiments, the quiesce operation can be initiated in response to an event detected within the CGRA, such as an exception condition or execution event detected by execution reaching a configured breakpoint, to aid in debugging. In response, the MAGCU sends a quiesce AGCU_CMD command to the configurable units in the array (1401). The quiesce logic in the array associated with each of the EFRGs in the array sets the Q_RCV_FF flag in response to the command. If the Q_PCPT flag for the unit is low, then the quiesce logic raises the Q_RDY signal on the daisy chain for its associated configurable unit (1402). If the Q_PCPT flag is high for the configurable unit, then the quiesce logic will stop the units in the EFRGs from proceeding beyond the QB, and raise the Q_RDY signal on the daisy chain on the quiesce boundary of the local execution fragment denoted by its skew UDC becoming equal to zero, immediately following the setting of the Q_RCV_FF flag for associated configurable unit (1403). The MAGCU waits to receive the Q_RDY signal on the daisy chain, or otherwise, from all of the participating configurable units (1404). When the Q_RDY signal is received for the participating configurable units, then the array is quiesced, and then MAGCU can transition to a next operation, such as an unload operation for a breakpoint or a checkpoint, in which the program and data resources in the array of configurable units are unloaded during the quiescent state (1405). Alternatively, the tile can remain quiesced without unloading, for example to await a resume command, setting up a subsequent breakpoint, or other external information or events before proceeding.

After unloading at the checkpoint, a different machine including a plurality of execution fragments can be implemented using the array by loading a new configuration file, or other operations can be executed. The quiesced machine unloaded at the checkpoint can be restored later, by reloading the checkpoint configuration, state, and data resources. Quiesce thus provides preemptive multitasking capability and a multiprogramming capability to the CGRA.

The ability to quiesce a distributed CGRA also enhances debug capability. For example, by defining fine-grain quiesce boundaries such as each iteration of an inner loop, or quiesce boundaries that can be triggered upon occurrence of an event such as an error or exception, or other breakpoint condition, CGRA execution can be halted, results inspected by a user, and then resumed, possibly after altering state, or terminated, as appropriate.

The quiesce logic and control barrier network technology described herein is suitable for implementation with CGRA devices. Also, it can be utilized with other types of processing systems that comprise an array of processing units that can benefit from coordination among execution fragments distributed among the array.

A method is described for operating a processing system including an array of configurable processing units configurable to implement a data processing operation or "machine" that allows for stopping the data processing operation on quiesce boundaries in a safe and reproducible manner. The method can be supported by quiesce logic circuits distributed among the array, and configured to set the quiesce boundaries.

The method can comprise loading configuration data to the array for a data processing operation, which configures the array into a plurality of execution fragment resource groups for corresponding execution fragments having quiesce boundaries. During execution of the data processing operation, the method can include distributing a quiesce command to the plurality of execution fragment resource groups in the array, using for example the quiesce logic circuits. In the execution fragment resource groups, the quiesce logic responds to the quiesce command to detect quiesce boundaries following the quiesce command in the corresponding execution fragments, disables execution of the corresponding execution fragments beyond the quiesce boundaries, and raises the quiesce ready signals for the corresponding execution fragments.

The quiesce boundaries can be defined in the configuration data by sets of configured states of execution in the configurable units of the execution fragment resource groups. The method can include responding to the quiesce command to detect quiesce boundaries by detecting the sets of configured states for the configurable units in each execution fragment resource group.

This quiesce capability enables unique operating scenarios for processing systems including arrays of configurable processing units such as multicore arrays, CGRAs or FPGAs and the like. For example, an operating method can include distributing the quiesce command in response to a request from a host, or in response to an event detected within the CGRA, to stop the data processing operation. After receiving the quiesce ready signals from the plurality of execution fragment resource groups, the method can include unloading the configuration and state from the array for use in debugging or other purposes.

Figure 15:
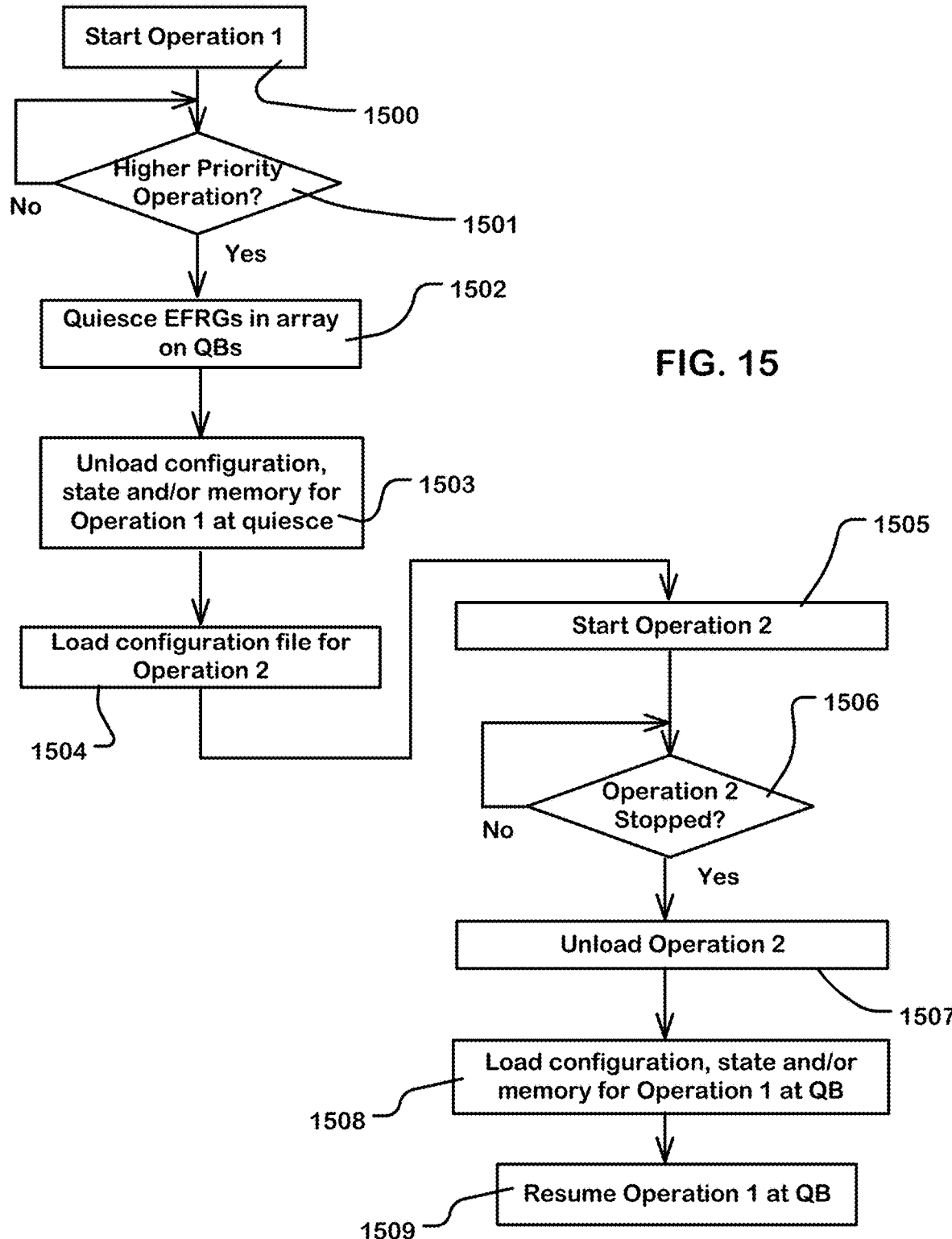
FIG. 15 is a flow chart for a method to change data processing operations in a configurable array using quiesce.

FIG. 15 illustrates an operating method which might be executed in a multitasking and in a multiprogramming environment, where a host or runtime program can manage a plurality of data processing operations having different levels of priority. For example, one data processing operation may be considered a background operation, to be executed only when higher priority operations are not necessary.

Referring to FIG. 15, a method can include starting operation 1 (1500), which might be a background operation. If the host detects a higher priority operation (1501), the method can quiesce the array, preferably by quiescing execution fragments in the array on their quiesce boundaries (1502), using technology like that described above. After quiesce, the host can unload configuration, state and/or memory data for operation 1 at the quiesce point (1503). This information can be saved for a later resume operation. After unloading operation 1, the configuration file for operation 2 is loaded (1504). After successfully loading operation 2, the operation can be started (1505). Operation 2 will execute until complete, or another event indicates that it can stop operation (1506). In some examples, operation 2 can be stopped using a quiesce operation like that described herein. After stopping operation 2, the configuration file for operation 2 can be unloaded (1507). Thereafter, the configuration, state and/or memory data unloaded for operation 1 at the quiesce can be reloaded into the array (1508). In some cases, the reloaded data can include modifications such as state changes, relative to the unloaded data. Then, operation 1 can be resumed at the quiesce boundary represented by the reloaded data (1509).

In other operations, the quiesce capability described herein can be used for breakpoint processing, useful for example during debugging. FIG. 16 is a simplified flowchart for this type of operation. In FIG. 16, operation 1 is begun in the configurable array (1600). If a breakpoint request is received at (1601), then a quiesce operation is executed causing quiesce of the EFRGs on the quiesce boundary QB(i) following the quiesce command (1602). After quiesce, the configuration, state and/or memory data for operation 1 at QB(i) can be copied to a holding memory (1603). Then, operation 1 can resume (1604). The host can then determine whether it has completed its breakpoint operations by determining whether QB(i) is the last breakpoint to be copied ((i)=N?) (1605). If the host is not finished at step 1605, then the host can increment the index (i) and issue a new quiesce command for the next quiesce boundary, returning the process to step (1602). If the host is finished at step (1605), then the breakpoint operation ends (1607), and the host can then analyze the breakpoint data downloaded at the sequence of quiesce boundaries.

Quiesce technology is provided that enables checkpoint, breakpoint, multitasking, multiprogramming and other utilizations of configurable arrays of processing units. The quiesce technology is described supported by quiesce circuits that are configurable to define quiesce boundaries for corresponding machines.

The quiesce technology does not require the use of instructions inserted in an instruction sequence of a data processing operation, and does not require data bus resources for the quiesce function.

In embodiments described herein, the array of processing units can comprise instruction processors, such as utilized in CPUs and GPUs, which operate on a stream of instructions, where instructions perform stateful operations. Instruction processors of this type are programmed using instructions, encoded into bits. A task is specified as an ordered list by software. These units have hardware architectures with mechanisms to track "program state". Program state would include, among other things, a form of a global "program counter" register, to track the next instruction to be fetched from memory. In addition, hardware architectures would also have a pipeline to decode and execute these instructions that have been fetched. In other words, these architectures contain a pipeline through which a stream of instructions flows during execution, where each instruction performs operations and updates the hardware state. Checkpointing such architectures involves saving the stateful elements of the architecture, such as the program counter and the register file. A GPU for example, can consist of an array of distributed computational units in cores, that generally rely on a shared pool of memory. The distributed computational units are stored-program processors which are programmable by writing instructions that are fetched, decoded, and executed like a normal processor. Synchronization and communication is achieved by executing sequences of instructions that operate on the shared memory.

In other embodiments of the technology described herein, the array of processing units comprise configurable units, in the sense of CGRAs which operate on streams of data and control messages (as opposed to instructions) that flow through a sea of configurable units, where the configurable units are programmed using configuration data, such as a bit file. Embodiments based on configurable units have architectures that look and operate differently than stored program instruction-based processors, as they have to manage execution in different ways.

Arrays of configurable units as in CGRAs and FPGAs have a different programming contract: configuration bits; these architectures do not have the hardware to fetch and process instructions. They do not have a global "program counter" register in the sense of instruction processors, and they do not have a pipeline that is built to fetch, decode, and execute an instruction stream. Instead, configurable execution units and stateful elements are physically distributed on chip, and connected together using a programmable interconnect. A program is not a stream of instructions; configuration bits program the configurable execution units to construct a custom control and data path for an application. Instead of a stream of instructions, the configurable units are programmed to operate on streams of data and control messages, to produce other data and control messages. This makes such architectures inherently distributed, without a single global program state.

The configurable units in an array of configurable units are reconfigurable, because of ability to load and unload the configuration data or bit file. All embodiments of the configurable units described herein are implemented using reconfigurable units, in preferred alternatives.

The distributed nature of execution in a CGRA and equivalent architectures makes it easier to build and scale hardware, but harder to perform global synchronization operations such as checkpointing.

A checkpointing scheme for these architectures can be implemented as described herein using a distributed protocol, and supporting configurable logic, that does not depend on a single global program state.

A CGRA comprises an array of reconfigurable components. The components can comprise somewhat specialized computational and memory units. These units are connected by a fabric to enable inter-unit communication and synchronization. The components may be reconfigured in several ways, but often rely on direct hardware reconfiguration by altering their behavior under control of configuration bits loaded from a bitfile, similar to an FPGA. No instructions are fetched, decoded, or executed; instead state machines are configured by the bitfile contents to implement sequences of operations.

As a result, units of a CGRA can't synchronize (including quiesce) by executing instructions. They must use an alternative. In this preferred embodiment, they exchange tokens represented as pulses on control wires in a control network, though CGRAs may use alternative mechanisms.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computer-implemented method for operating a processing system including an array of configurable processing units, comprising:
    configuring a spatially configurable array of configurable processing units for execution of a data processing operation, the data processing operation including a plurality of execution fragments, by configuring a plurality of resource groups of configurable processing units in the array to execute respective execution fragments of the plurality of execution fragments; and
    during execution of the data processing operation using the spatially configurable array, responding to a control signal to quiesce the plurality of resource groups on quiesce boundaries of the respective execution fragments.

2. The method of claim 1, including generating the control signal in response to an internal event originating in the array.

3. The method of claim 1, including generating the control signal in response to an external event originating outside the array.

4. The method of claim 1, wherein the control signal is asynchronous relative to the plurality of execution fragments.

5. The method of claim 1, including configuring the quiesce boundaries using configuration data defining sets of configured states of execution in the processing units of the resource groups configured to execute the respective execution fragments.

6. A non-transitory computer readable storage medium impressed with computer program instructions, the instructions, when executed on a processor, implement a method comprising:
    configuring a spatially configurable array of configurable processing units for execution of a data processing operation, the data processing operation including a plurality of execution fragments, by configuring a plurality of resource groups of configurable processing units in the array to execute respective execution fragments of the plurality of execution fragments; and
    during execution of the data processing operation using the spatially configurable array, responding to a control signal to quiesce the plurality of resource groups on quiesce boundaries of the respective execution fragments.

7. The non-transitory computer readable storage medium of claim 6, implementing the method further comprising generating the control signal in response to an internal event originating in the array.

8. The non-transitory computer readable storage medium of claim 6, implementing the method further comprising generating the control signal in response to an external event originating outside the array.

9. The non-transitory computer readable storage medium of claim 6, wherein the control signal is asynchronous relative to the plurality of execution fragments.

10. The non-transitory computer readable storage medium of claim 6, implementing the method further comprising configuring the quiesce boundaries using configuration data defining sets of configured states of execution in the processing units of the resource groups configured to execute the respective execution fragments.

\* \* \* \* \*